US011960786B2

(12) United States Patent
Hwang

(10) Patent No.: US 11,960,786 B2
(45) Date of Patent: Apr. 16, 2024

(54) DISPLAY DEVICE

(71) Applicant: LG ELECTRONICS INC., Seoul (KR)

(72) Inventor: Sungphil Hwang, Seoul (KR)

(73) Assignee: LG ELECTRONICS INC, Seoul (KR)

(*) Notice: Subject to any disclaimer, the term of this patent is extended or adjusted under 35 U.S.C. 154(b) by 772 days.

(21) Appl. No.: 17/016,278

(22) Filed: Sep. 9, 2020

(65) Prior Publication Data

US 2021/0389923 A1 Dec. 16, 2021

(30) Foreign Application Priority Data

Jun. 12, 2020 (KR) .................. 10-2020-0071520

(51) Int. Cl.
*G06F 3/16* (2006.01)
*F16M 11/12* (2006.01)
*G06F 1/16* (2006.01)
*H04R 5/04* (2006.01)

(52) U.S. Cl.
CPC ............. *G06F 3/16* (2013.01); *F16M 11/125* (2013.01); *G06F 1/1605* (2013.01); *G06F 3/165* (2013.01); *H04R 5/04* (2013.01); *H04R 2420/07* (2013.01); *H04R 2499/15* (2013.01)

(58) Field of Classification Search
CPC .......... G06F 3/16; G06F 1/1605; G06F 3/165; G06F 2200/1612; G06F 2200/1614; G06F 1/1688; G06F 1/1694; F16M 11/125; F16M 11/105; F16M 11/2021; H04R 5/04; H04R 2420/07; H04R 2499/15; H04R 1/026
USPC .......................................................... 381/89
See application file for complete search history.

(56) References Cited

U.S. PATENT DOCUMENTS

2007/0153137 A1* 7/2007 Hsu ...................... G06F 1/1601
348/790

FOREIGN PATENT DOCUMENTS

| KR | 20070049381 | * | 5/2007 | ............... H04B 1/38 |
| KR | 1020070049381 | | 5/2007 | |
| KR | 1020080046927 | | 5/2008 | |
| KR | 1020110038559 | | 4/2011 | |

(Continued)

OTHER PUBLICATIONS

Korean Intellectual Property Office Application No. 10-2020-0071520, Office Action dated Mar. 18, 2021, 45 pages.

(Continued)

*Primary Examiner* — Yosef K Laekemariam
(74) *Attorney, Agent, or Firm* — LEE, HONG, DEGERMAN, KANG & WAIMEY

(57) ABSTRACT

A display device includes a head including a display formed on a front surface thereof, a circumference having a pair of long sides and a pair of short sides, and one or more first speakers provided on a left short side and one or more second speakers provided on a right short side of the display and configured to be pivotable between a landscape mode in which the long sides are in a horizontal state and a portrait mode in which the long sides are in a vertical state, a sensor configured to detect pivot of the head, and a processor configured to determine a pivot state indicating whether the head is in the landscape mode or the portrait mode based on a result of detection and switch sound signals output by the first speakers and the second speakers when the pivot state of the head is switched.

17 Claims, 34 Drawing Sheets

(56) References Cited

FOREIGN PATENT DOCUMENTS

KR         101543535        8/2015

OTHER PUBLICATIONS

PCT International Application No. PCT/KR2020/011000, International Search Report dated Apr. 26, 2021, 70 pages.

* cited by examiner

DISPLAY DEVICE

CROSS REFERENCE TO RELATED APPLICATION(S)

Pursuant to 35 U.S.C. § 119(a), this application claims the benefit of earlier filing date and right of priority to Korean Patent Application No. 10-2020-0071520, filed on Jun. 12, 2020, the contents of which are all hereby incorporated by reference herein in their entirety.

BACKGROUND

The present disclosure relates to a display device and, more particularly, to a display device having a rotatable head including a display.

A display device displays image information received from the outside or image information stored therein. Representative examples of the display device include a television, a monitor, a laptop, a smartphone, etc.

However, conventional mobile display devices such as smartphones have limited sizes for portability. On the contrary, relatively large display devices such as TVs require a wide installation space and have inconvenient mobility.

SUMMARY

The present disclosure is devised to solve the above-described problems and an object of the present disclosure is to provide a display device capable of controlling the type of sound output from speakers which rotate as a head rotates.

Another object of the present disclosure is to provide optimal sound by controlling the type of sound output from speakers according to the locations of the speakers rotating along with a head.

Another object of the present disclosure is to provide a natural sound effect during rotation in a landscape mode or a portrait mode by controlling the type of sound output from speakers when a head rotates in the landscape mode or the portrait mode.

Another object of the present disclosure is to provide a display device having a pair of long sides and a pair of short sides and having a natural sound effect satisfied by a user, by controlling the type of sound output from speakers even if arrangement of speakers in a landscape mode in which the long sides are in a horizontal state and arrangement of speakers in a portrait mode in which the long sides are in a vertical state are different.

A display device according to an embodiment of the present disclosure includes a head including a display formed on a front surface thereof, a circumference having a pair of long sides and a pair of short sides, and one or more first speakers provided on a left short side and one or more second speakers provided on a right short side of the display and configured to be pivotable between a landscape mode in which the long sides are in a horizontal state and a portrait mode in which the long sides are in a vertical state, a sensor configured to detect pivot of the head, and a processor configured to determine a pivot state indicating whether the head is in the landscape mode or the portrait mode based on a result of detection and switch sound signals output by the first speakers and the second speakers when the pivot state of the head is switched.

A display device according to an embodiment of the present disclosure includes a head including a display formed on a front surface thereof, a circumference having a pair of long sides and a pair of short sides, and a plurality of panel speakers attached to a panel of the display and configured to be pivotable between a landscape mode in which the long sides are in a horizontal state and a portrait mode in which the long sides are in a vertical state, a sensor configured to detect pivot of the head, and a processor configured to determine a pivot state indicating whether the head is in the landscape mode or the portrait mode based on a result of detection and switch sound signals output by the panel speakers when the pivot state of the head is switched.

DETAILED DESCRIPTION OF THE EMBODIMENTS

Hereinafter, specific embodiments of the present disclosure will be described in detail with reference to the drawings.

In the following, when one element is described as being "fastened" or "connected", this may mean that two elements are directly fastened or connected or mean a third element is interposed between two elements and the two elements are connected or fastened by the third element. In contrast, one element being "directly fastened" or "directly connected" to another element may mean that a third element is not interposed between the two elements.

Figure 1:
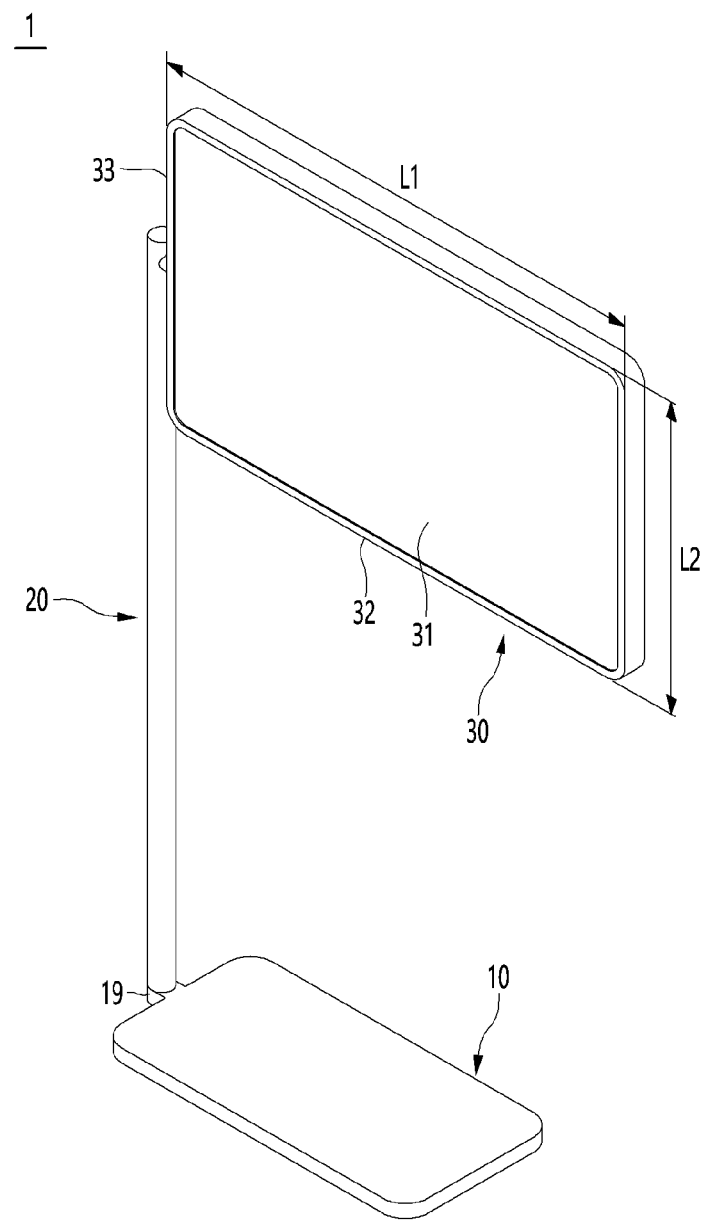
FIG. 1 is a front view of a display device according to an embodiment of the present disclosure.
Figure 2:
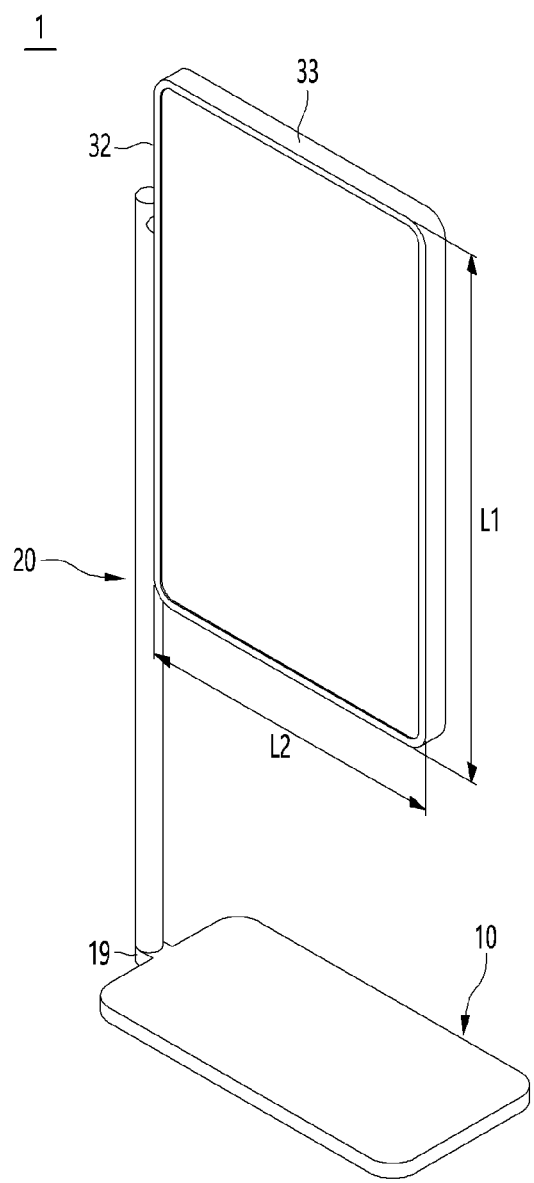
FIG. 2 is a front view showing a state in which a header shown in FIG. 1 is pivoted in a portrait mode.
Figure 3:
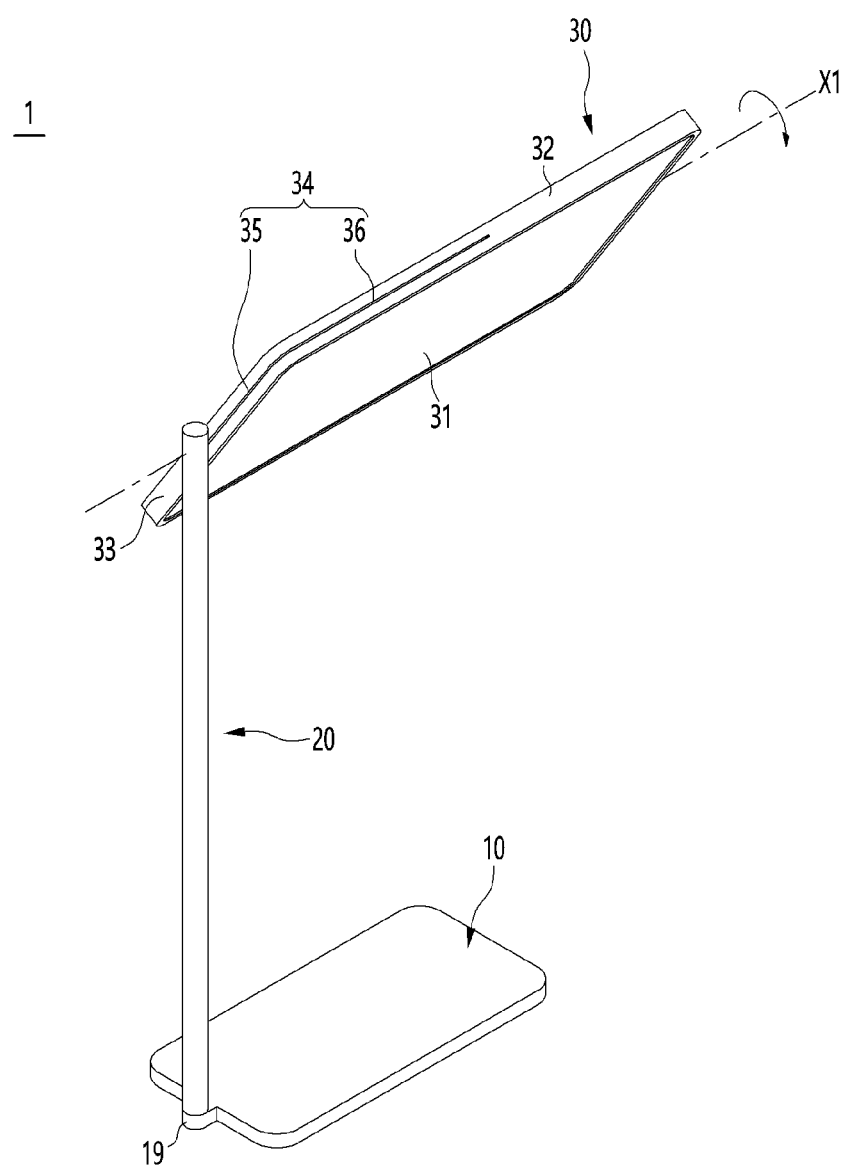
FIG. 3 is a view showing a state in which a head according to an embodiment of the present disclosure is tilted.
Figure 4:
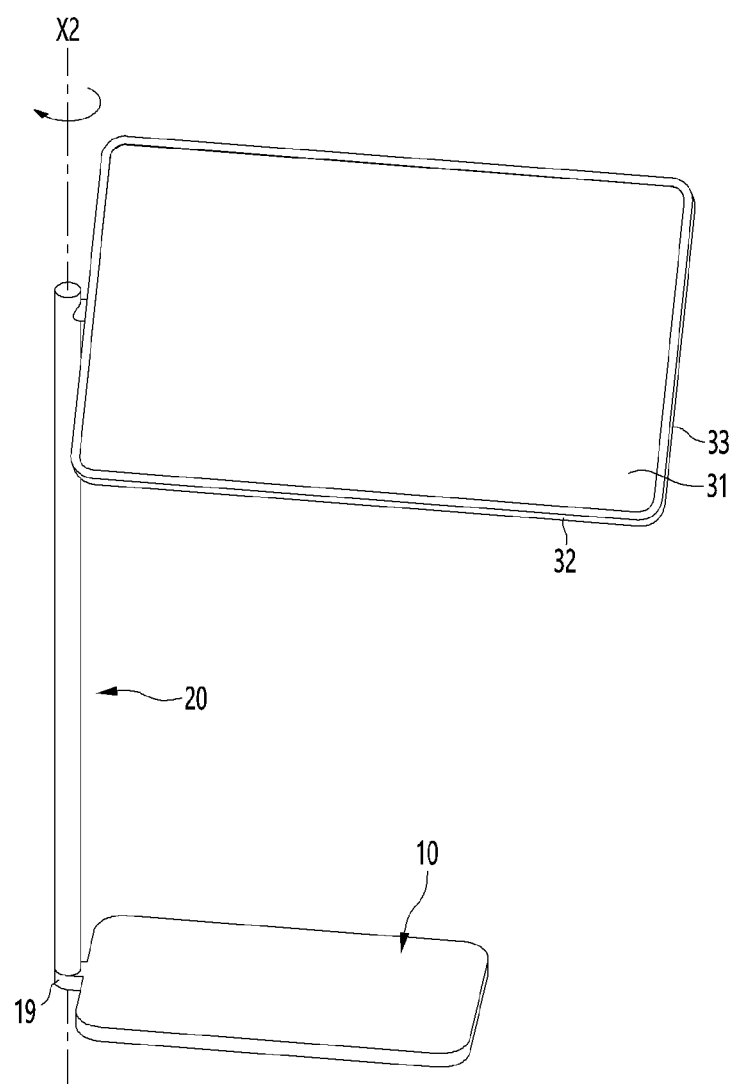
FIG. 4 is a view showing a state in which a head according to an embodiment of the present disclosure is swiveled.

FIG. 1 is a front view of a display device according to an embodiment of the present disclosure, FIG. 2 is a front view showing a state in which a header shown in FIG. 1 is pivoted in a portrait mode, FIG. 3 is a view showing a state in which a head according to an embodiment of the present disclosure is tilted, and FIG. 4 is a view showing a state in which a head according to an embodiment of the present disclosure is swiveled.

The display device 1 according to the embodiment of the present disclosure may include a base 10, a stand bar 20 and a head 30.

The base 10 may support the display device 1 against a floor.

The stand bar 20 may vertically extend upward from the base 10. The stand bar 20 may connect the base 10 with the head 30.

More specifically, the lower end of the stand bar 20 may be connected to the circumference of the base 10. A stand bar connector 19 protruding outward may be formed on the circumference of the base 10, and the lower end of the stand bar 20 may be connected to the stand bar connector 19.

The head 30 may be spaced apart upward from the base 10. A display 31 may be provided on the front surface of the head 30. An image or video may be displayed on the display 31. In addition, the display 31 may include a touchscreen.

Circumferences 32 and 33 of the head 30 may include a pair of long sides 32 and a pair of short sides 33. The longitudinal direction of the long side 32 and the longitudinal direction of the short side 33 may be perpendicular to each other. The length L1 of the long side 32 may be greater than the length L2 of the short side 33.

The head 30 may be pivoted between a landscape mode in which the long sides 32 are horizontal and the short sides 33 are vertical (see FIG. 1) and a portrait mode in which the long sides 32 are vertical and the short sides 33 are horizontal (see FIG. 2).

The head 30 may be located on the same side as the base 10 with respect to the stand bar 20. That is, the head 30 may overlap the base 10 in the vertical direction. Accordingly, since the center of gravity of the display device 1 does not deviate from the upper side of the base 10, the display device 1 may be stably supported without being overturned.

The left-and-right length of the base 10 may be less than the length L1 of the long side 32 of the head 30 and greater than the length L2 of the short side 33. Accordingly, in the landscape mode, the head 30 may laterally protrude from the base 10. The base 10 may laterally protrude from the head 30 in the portrait mode.

The stand bar 20 may extend to be sufficiently long. The height of the stand bar 20 may be greater than the length L1 of the long side 32 of the head 30. The height of the stand bar 20 may be greater than the sum L1+L2 of the length L1 of the long side 32 of the head 30 and the length L2 of the short side.

The stand bar 20 may be connected to the circumferences 32 and 33 of the head 30. More specifically, the upper portion of the stand bar 20 may be connected to the circumferences 32 and 33 of the head 30.

Since the stand bar 20 is connected to the circumferences 32 and 33 rather than the rear surface of the head 30, the design of the appearance of the display device 1 may be improved, and the rear surface of the head 30 may be used for another purpose (e.g., a mirror).

The upper portion of the stand bar 20 may face the circumferences 32 and 33 of the head 30 in the horizontal direction. More specifically, in the landscape mode, the upper portion of the stand bar 20 may face the short sides 33 of the head 30 in the horizontal direction. In the portrait mode, the upper portion of the stand bar 20 may face the long sides 32 of the head 30 in the horizontal direction.

A penetration groove 34 may be formed in the circumferences 32 and 33 of the head 30. The penetration groove 34 may extend along the circumferences 32 and 33 of the head 30.

The head 30 may be connected to the stand bar 20 through the penetration groove 34.

More specifically, a connection pin 22 (see FIG. 10) protruding toward the penetration groove 34 may be formed on the stand bar 20. The connection pin 22 may be connected to a connecting bar 40 through the penetration groove 34.

The penetration groove 34 may include a first groove 35 formed in the short side 33 and a second groove 36 formed in the long side 32. The first groove 35 may extend along the short side 33 and the second groove 36 may extend along the long side 32. The first groove 35 and the second groove 36 may be connected. The first groove 35 and the second groove 36 may be connected at a corner of the circumferences 32 and 33.

The first groove 35 may be formed in any one of the pair of short sides 33. The length of the first groove 35 may be less than that of the short side 33 and may be greater to or equal to half the length of the short side 33.

The second groove 36 may be formed in any one of the pair of long sides 32. The length of the second groove 36 may be less than that of the long side and may be greater to or equal to half the length of the long side 32.

Accordingly, at the time of pivot of the head 30, the connection pin 22 of the stand bar 20 may be maintained in a state of passing through the penetration groove 34. In the landscape mode, the stand bar 20 may be connected with the head 30 through the first groove 35. In the portrait mode, the stand bar 20 may be connected with the head 30 through the second groove 36.

Meanwhile, as shown in FIG. 3, the head 30 may rotate about a horizontal axis x1 with respect to the stand bar 20. The horizontal axis x1 may correspond to the connection pin 22 (see FIG. 20) of the stand bar 20. That is, the head 30 may be tilted by a predetermined angle with respect to the horizontal axis x1.

The head 30 may be tilted regardless of pivot of the head 30. That is, the head 30 may be tilted in the landscape mode and may be tilted in the portrait mode.

In addition, as shown in FIG. 4, the head 30 may rotate about a vertical axis x2 with respect to the base 10 along with the stand bar 20. More specifically, the lower end of the stand bar 20 may be rotatably connected to the stand bar connector 19 of the base 10. Accordingly, the head 30 may be swiveled by a predetermined angle with respect to the vertical axis x2.

The swivel operation of the head 30 may be performed regardless of pivot and tilt of the head 30. That is, the head 30 may be swiveled in the landscape mode, may be swiveled in the portrait mode, and may be swiveled in a state of being tilted by a predetermined angle.

Figure 5:
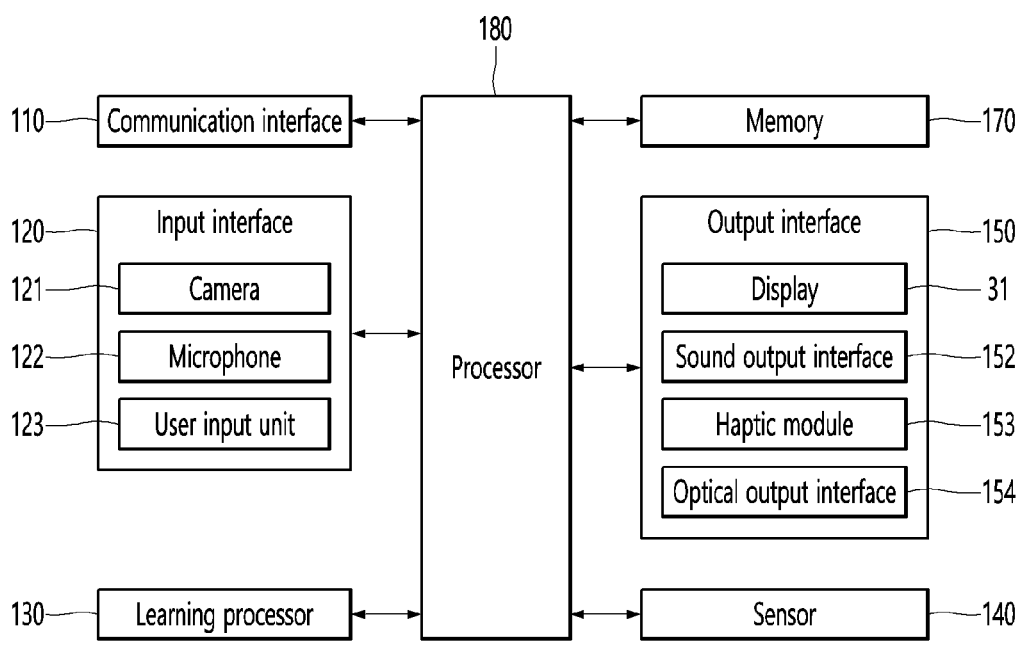
FIG. 5 is a block diagram illustrating components of a display device according to an embodiment of the present disclosure.

FIG. 5 is a block diagram illustrating components of a display device according to an embodiment of the present disclosure.

In particular, the components of FIG. 5 may be included in the head 30 of FIG. 1.

Referring to FIG. 5, the display device 1 may include a communication interface 110, an input interface 120, a learning processor 130, a sensor 140, an output interface 150, a memory 170 and a processor 180.

The communication interface 110 may transmit and receive data to and from external devices such as another terminal or an external server using wired/wireless communication technology. For example, the communication interface 110 may transmit and receive sensor information, user input, learning models, control signals, etc. to and from the external devices.

At this time, communication technologies used by the communication interface 110 may include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), etc.

The input interface 120 may acquire various types of data.

At this time, the input interface 120 may include a camera for receiving an image signal, a microphone for receiving an audio signal, a user input interface for receiving information from a user, etc. Here, the camera or the microphone may be treated as a sensor, and signals acquired from the camera or the microphone may be referred to as sensing data or sensor information.

The input interface 120 may acquire input data to be used when output is acquired using learning data and learning models for model learning. The input interface 120 may acquire raw input data and, in this case, the processor 180 or the learning processor 130 may extract input features as preprocessing of input data.

The input interface 120 may include a camera 121 for receiving an image signal, a microphone 122 for receiving an audio signal, and a user input unit 123 for receiving information from a user.

The voice data or image data collected by the input interface 120 may be analyzed and processed as control commands of the user.

The input interface 120 serves to receive image information (or signals), audio information (or signals), data or user input information, and, for input of the image information, the display device 1 may include one or a plurality of cameras 121.

The camera 121 processes an image frame such as a still image or a moving image obtained by an image sensor in a video call mode or a capture mode. The processed image frame may be displayed on a display 31 or a memory 170.

The microphone 122 processes an external acoustic signal into electrical audio data. The processed audio data may be variously used according to the function (or application program) executed in the display device 1. Meanwhile, the microphone 122 may include various noise removal algorithms to remove noise generated in the process of receiving the external sound signal.

The user input interface 123 receives information from the user, and, when information is received through the user input interface 123, the processor 180 may control operation of the display device 1 to correspond to the received information.

The user input unit 123 may include one or more of a mechanical input element (for example, a mechanical key, a button located on a front and/or rear surface or a side surface of the terminal 1, a dome switch, a jog wheel, a jog switch, and the like) or a touch input element. As one example, the touch input element may be a virtual key, a soft key or a visual key, which is displayed on a touchscreen through software processing, or a touch key located on a location other than the touchscreen.

The learning processor 130 may train a model composed of an artificial neural network using learning data. Here, the trained artificial neural network may be referred to as a learning model. The learning model may be used to infer a result value with respect to new input data rather than learning data, and the inferred value may be used as a basis for determining certain operation.

At this time, the learning processor 130 may include a memory integrated with or implemented in the display device 1. Alternatively, the learning processor 130 may be implemented using the memory 170, an external memory directly coupled to the display device 1 or a memory maintained in an external device.

The sensor 140 may acquire at least one of internal information of the display device 1, surrounding environment information of the display device 1 or user information using various sensors.

At this time, the sensor included in the sensor 140 may include a proximity sensor, an illumination sensor, an acceleration sensor, a magnetic sensor, a gyroscope sensor, an inertia sensor, an RGB sensor, a finger scan sensor, an ultrasonic sensor, an optical sensor, a microphone, a Lidar, a radar, etc.

The output interface 150 may generate video, audio or tactile output.

At this time, the output interface 150 may include a display for outputting video information, a speaker for outputting audio information, and a haptic module for outputting tactile information, etc.

The output interface 150 may include at least one of a display 31, a sound output unit 152, a haptic module 153 or an optical output unit 154.

The display 31 displays (outputs) information processed in the display device 1. For example, the display 31 may display execution screen information of an application program executed by the display device 1 or user interface (UI) and graphical user interface (GUI) information according to the executed screen information.

The display 31 may have an inter-layered structure or an integrated structure with a touch sensor in order to realize a touchscreen. The touchscreen may function as the user input unit 123 which provides an input interface between the display device 1 and the user and provide an output interface between the terminal 1 and a user.

The sound output interface 152 may output audio data received from the communication interface 110 or stored in the memory 170 in a call signal reception mode, a call mode, a record mode, a speech recognition mode, a broadcast reception mode, and the like.

The sound output interface 152 may also include a receiver, a speaker, a buzzer, or the like.

The haptic module 153 generates various tactile effects that a user feels. A typical example of a tactile effect generated by the haptic module 153 is vibration.

The optical output interface 154 may output a signal indicating event generation using light of a light source of the display device 1. Examples of events generated in the display device 1 may include message reception, call signal reception, a missed call, an alarm, a schedule notice, email reception, information reception through an application, and the like.

The memory 170 may store data supporting various functions of the display device 1. For example, the memory 170 may store input data, learning data, a learning model, a learning history, etc. acquired in the input interface 120.

The processor 180 may determine at least one executable operation of the display device 1 based on information determined or generated using a data analysis algorithm or a machine learning algorithm. In addition, the processor 180 may control the components of the display device 1 to perform the determined operation.

To this end, the processor 180 may request, search for, receive or use the data of the learning processor 130 or the memory 170, and control the components of the display device 1 to perform predicted operation or operation determined to be preferable among the at least one executable operation.

At this time, the processor 180 may generate a control signal for controlling an external device and transmit the generated control signal to the external device, when connection of the external device is necessary to perform the determined operation.

The processor 180 may acquire intention information with respect to user input and determine a request of the user based on the acquired intention information.

At this time, the processor 180 may acquire intention information corresponding to user input using at least one of a speech-to-text (STT) engine for converting voice input into a character string or a natural language processing (NLP) engine for acquiring intention information of a natural language.

At this time, at least one of the STT engine or the NLP engine may be composed of an artificial neural network learned according to a machine learning algorithm. In addition, at least one of the STT engine or the NLP engine may be learned by the learning processor 130, learned by an external learned server or learned by distribution processing thereof.

The processor 180 may collect history information including content on operation of the display device 1 or the feedback of the user for the operation, sore the history information in the memory 170 or the learning processor 130 or transmit the history information to an external device such as an external server. The collected history information may be used to update the learning model.

The processor 180 may control at least some of the components of the display device 1, in order to drive an application program stored in the memory 170. Further, the processor 180 may operate by combining two or more of the components included in the display device 1, in order to drive the application program.

Figure 6:
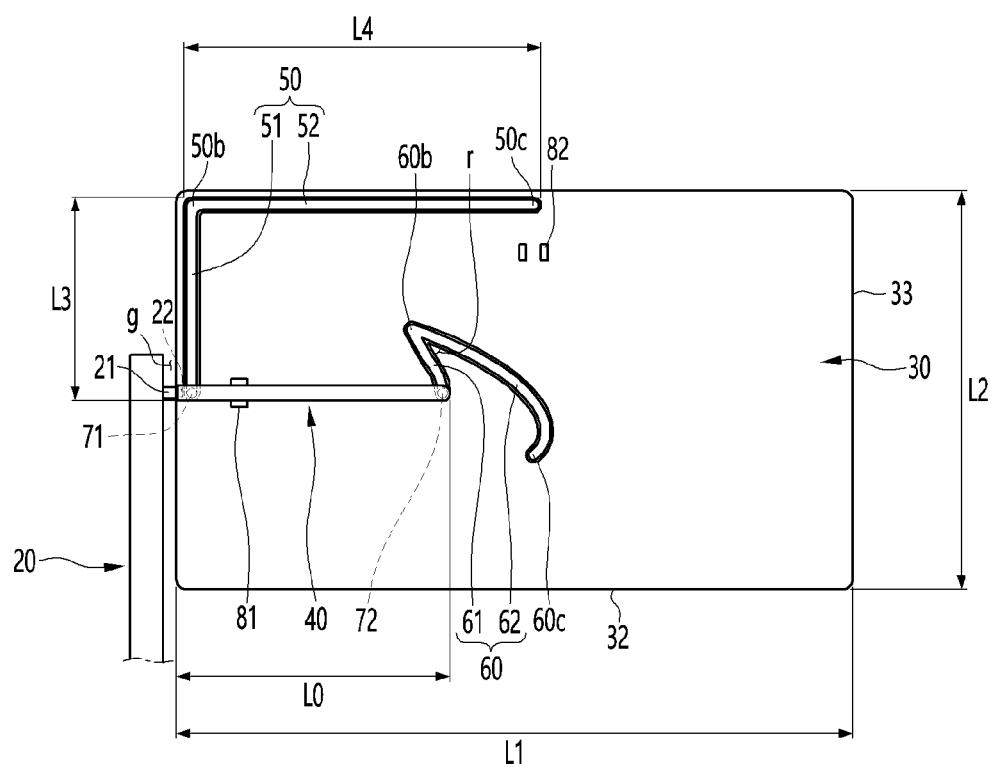
FIGS. 6 to 8 are views illustrating pivot operation of a head according to an embodiment of the present disclosure.
Figure 7:
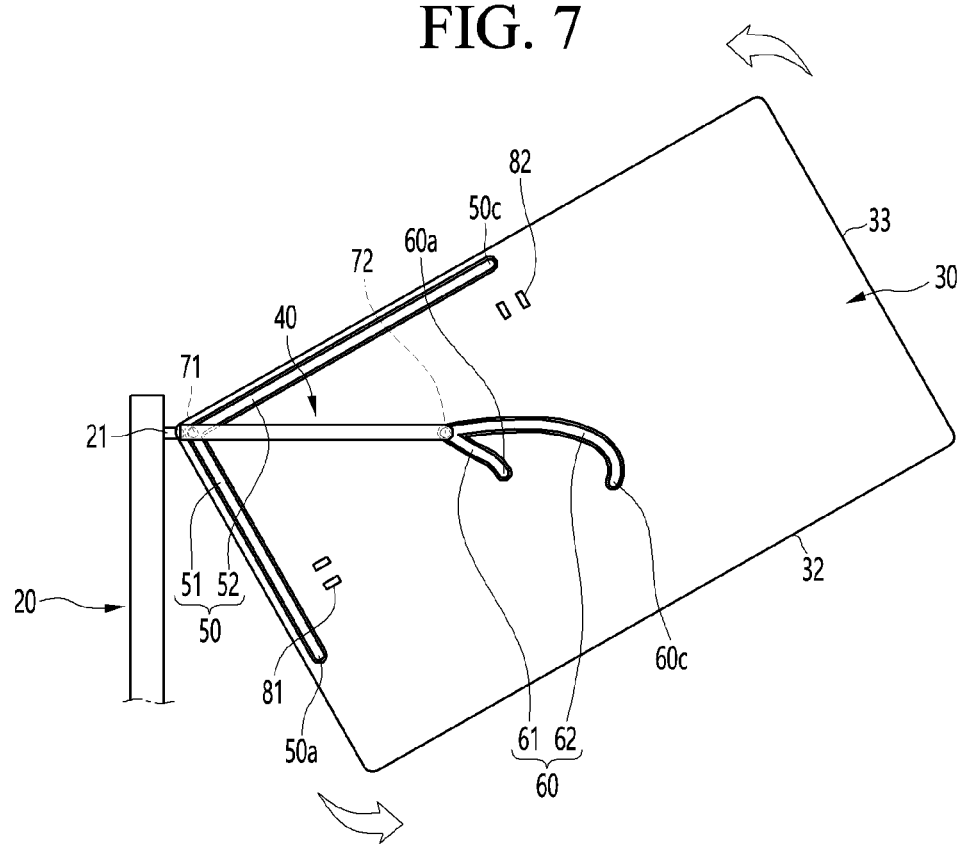
Figure 8:
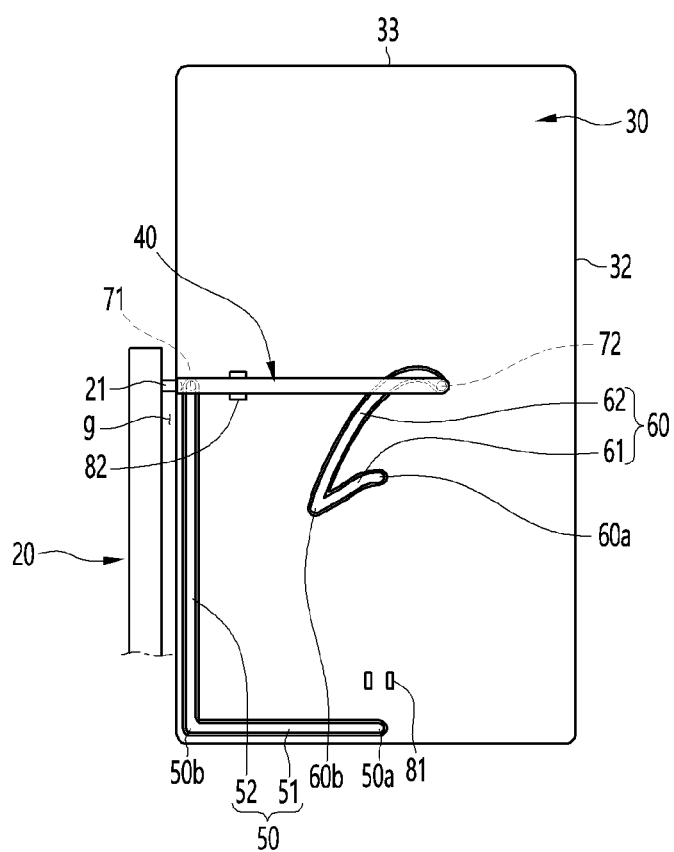
Figure 9:
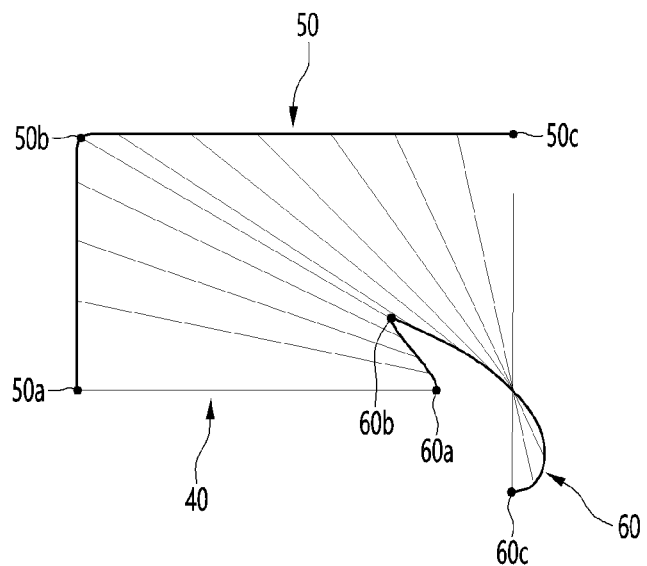
FIG. 9 is a view showing the trajectory of a connecting bar during pivot operation of a head according to an embodiment of the present disclosure.

FIGS. 6 to 8 are views illustrating pivot operation of a head according to an embodiment of the present disclosure. FIG. 9 is a view showing the trajectory of a connecting bar during pivot operation of a head according to an embodiment of the present disclosure.

The display device 1 according to the embodiment of the present disclosure may further include a connecting bar 40, an outer rail 50 and an inner rail 60.

The connecting bar 40 may be located inside the head 30 and may be connected to the stand bar 20 through the penetration groove 34 (see FIG. 3). The connecting bar 40 may horizontally extend. The connecting bar 40 may be maintained in a horizontal state without rotating along with the head 30 during pivot of the head 30.

More specifically, a horizontally protruding protrusion 21 may be formed on the stand bar 20, and the connection pin 22 may extend from an end of the protrusion 21. The protrusion 21 may have a diameter or size to disable the penetration groove 34 from passing therethrough.

The protrusion 21 may space the circumferences 32 and 33 of the head 30 apart from the stand bar 20 in the horizontal direction. That is, a gap g may be formed between the circumferences 32 and 33 of the head 30 and the stand bar 20. Accordingly, the head 30 may be smoothly pivoted without interfering with the stand bar 20.

The extension pin 22 may extend in parallel with the protrusion 21 to be inserted into the penetration groove 34 and may be connected to the end of the connecting bar 40. As described above, the extension pin 22 may be rotatably connected to the connecting bar 40, and the head 30 may be tilted with respect to the extension pin 22 along with the connecting bar 40.

The length L0 of the connecting bar 40 may be less than half the length L1 of the long side 32 of the head 30 and may be greater than half the length L2 of the short side 33 of the head 30.

The outer rail 50 and the inner rail 60 may be fixed to the inside of the head 30, and may rotate along with the head 30 at the time of pivot of the head 30.

The inner rail 60 may be spaced apart from the inside of the outer rail 50. More specifically, the outer rail 50 may be fixed to the inner edge of the head 30, and the inner rail 60 may be fixed to the inner central portion of the head 30.

The outer rail 50 may extend along the penetration groove 34 and the inner rail 60 may include a curved trajectory.

The outer rail 50 may be connected to the connecting bar 60 through a first hinge 71, and the inner rail 60 may be connected to the connecting bar 60 through a second hinge 72. More specifically, the outer end of the connecting bar may be connected to the outer rail 50 through the first hinge 71, and the inner end of the connecting bar 40 may be connected to the inner rail 60 through the second hinge 72.

The hinge shafts of the first hinge 71 and the second hinge 72 may be perpendicular to the front surface of the head 30, that is, the display 31. In addition, the hinge shafts of the first hinge 71 and the second hinge 72 may be perpendicular to the connection pin 22 of the stand bar 20.

The first hinge 71 and the second hinge 72 may be restricted with respect to the longitudinal direction of the connecting bar 40. The first hinge 71 may not be restricted with respect to the longitudinal direction of the outer rail 50, and the second hinge 72 may not be restricted with respect to the longitudinal direction of the inner rail 60.

Accordingly, when the head 30 is pivoted, the locations of the first hinge 71 and the second hinge 72 relative to the connecting bar 40 may be fixed. In addition, the outer rail 50 may slide against the first hinge 71, and the inner rail 60 may slide against the second hinge 72.

The connecting bar 40 may be a rigid body and the length thereof may not be changed. Accordingly, the pivot trajectory of the head 30 may be determined the shapes of the outer rail 50 and the inner rail 60.

The outer rail 50 may include a first outer rail 51 extending in parallel with the short side 33 of the head 30 and a second outer rail 52 extending in parallel with the long side 32 of the head 30.

The first outer rail 51 and the second outer rail 52 may be connected. A connector 50b between the first outer rail 51 and the second outer rail 52 may be located on a point corresponding to the corner of the head 30.

The first outer rail 51 and the second outer rail 52 may be integrally formed. The first outer rail 51 may be bent from the second outer rail 52. The connector 50b between the first outer rail 51 and the second outer rail 52 may be a bending portion of the outer rail 50.

The first outer rail 51 and the second outer rail 52 may be perpendicular to each other.

The length L3 of the first outer rail 51 may be less than the length L2 of the short side 33 of the head 30 and may be equal to or greater than half the length L2 of the short side 33.

The length L4 of the second outer rail 52 may be less than the length L1 of the long side 32 of the head 30 and may be equal to or greater than half the length L1 of the long side 32.

The inner rail 60 may include a first inner rail 61 and a second inner rail 62 bent from the first inner rail 61.

The first inner rail 61 and the second inner rail 62 may be connected. The first inner rail 61 and the second inner rail 62 may be integrally formed. The first inner rail 61 may be bent from the second inner rail 62. A connector 60b between the first inner rail 61 and the second inner rail 62 may be a bending portion of the inner rail 60.

Each of the first inner rail 61 and the second inner rail 62 may have a curved trajectory. The length of the second inner rail 62 may be greater than that of the first inner rail 61.

An angle r between the first inner rail 61 and the second inner rail 62 may be less than 90 degrees. That is, the angle may be an acute angle.

Referring to FIG. 6, in the landscape mode of the head 30, the first hinge 71 may be located on one end 50a of the outer rail 50, that is, the end 50a of the first outer rail 51. In addition, the second hinge 72 may be located on one end 60a of the inner rail 60, that is, the end 60a of the first inner rail 61.

That is, in the landscape mode of the head 30, the first inner rail 61 may be connected with the first outer rail 51 by the connecting bar 40. The connecting bar 40 may connect one end 50a of the outer rail 50 with one end 60a of the inner rail 60.

Referring to FIG. 7, during the pivot operation of the head 30, the connector 50b between the first outer rail 51 and the second outer rail 52 may pass through the first hinge 71. In addition, the connector 60b between the first inner rail 61 and the second inner rail 62 may pass through the second hinge 72.

Referring to FIG. 8, in the portrait mode of the head 30, the first hinge 71 may be located on the other end 50c of the outer rail 50, that is, the end 50c of the second outer rail 52. In addition, the second hinge 72 may be located on the other end 60c of the inner rail 60, that is, the end 60c of the second inner rail 62.

That is, in the portrait mode of the head 30, the second inner rail 62 may be connected with the second outer rail 52 by the connecting bar 40. The connecting bar 40 may connect the other end 50c of the outer rail 50 with the other end 60c of the inner rail 60.

Referring to FIG. 9, a plurality of points included in the outer rail 50 may be spaced apart from a plurality of points included in the inner rail 60 by a certain distance to one-to-one correspond to each other. The certain distance may mean a distance between the first hinge 71 and the second hinge 72 in the longitudinal direction of the connecting bar 40.

More specifically, the distance between the end 50a of the first outer rail 51 and the end 60a of the first inner rail 61 may be equal to the distance between the first hinge 71 and the second hinge 72.

In addition, the distance between the end 50c of the second outer rail 52 and the end 60c of the second inner rail 62 may be equal to the distance between the first hinge 71 and the second hinge 72.

In addition, the distance from the connector 50b between the first outer rail 51 and the second outer rail 52 to the connector 60b between the first inner rail 61 and the second inner rail 62 may be equal to the distance between the first hinge 71 and the second hinge 72.

Accordingly, the head 30 may be smoothly pivoted without changing the length of the connecting bar 40.

Meanwhile, the inner surface of the head 30 may be provided with latches 81 and 82 protruding inward. The latches 81 and 82 may be supported by the connecting bar 40. The latches 81 and 82 may restrict the head 30 to the connecting bar 40.

In addition, the head 30 may be provided with an elastic member (not shown) for pressuring the latches 81 and 82 in a protrusion direction. When the latches 81 and 82 are pressured by the connecting bar 40, the elastic member may be compressed. In addition, when the connecting bar 40 does not pressurize the latches 81 and 82, a state in which the latches 81 and 82 protrude to the inside of the head 30 by the elastic force of the elastic member may be maintained.

Accordingly, when sufficient external force is not applied to the head 30, the head 30 may be maintained in the landscape mode or the portrait mode. In addition, when the user applies force to the head 30 to rotate the head 30, the connecting bar 40 is not locked to the latches 81 and 82, such that the head 30 is smoothly pivoted.

More specifically, the latches 81 and 82 may include a first latch 81 for restricting the head 30 to the connecting bar 40 in the landscape mode of the head 30 and a second latch 82 for restricting the head 30 to the connecting bar in the portrait mode of the head 30.

The first latch 81 may include one protruding piece located above the connecting bar 40 in the landscape mode of the head 30. The first latch 81 may further include another protrusion piece located below the connecting bar 40 in the landscape mode of the head 30.

The first latch 81 may prevent the head 30 in the landscape mode from rotating or moving when sufficient external force is not applied to the head 30.

The second latch 82 may include one protrusion piece located below the connecting bar 40 in the portrait mode of the head 30. The second latch 82 may further include another protrusion piece located above the connecting bar 40 in the portrait mode of the head 30.

The second latch 82 may prevent the head 30 in the portrait mode from rotating or moving, when sufficient external force is not applied to the head 30.

Figure 10:
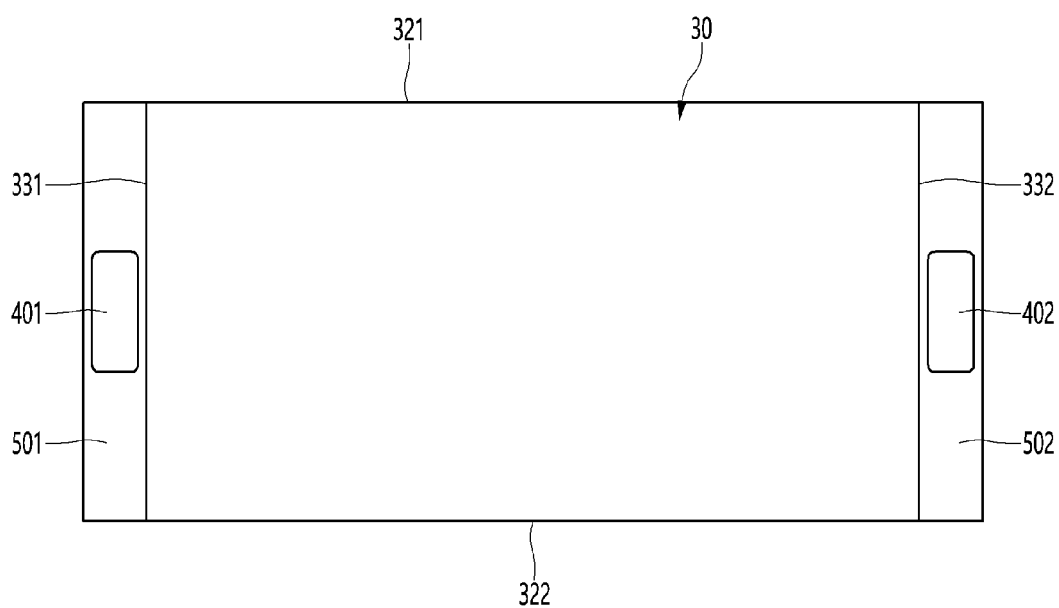
FIG. 10 is a view showing a first landscape mode state of a head including a speaker according to an embodiment of the present disclosure.
Figure 11:
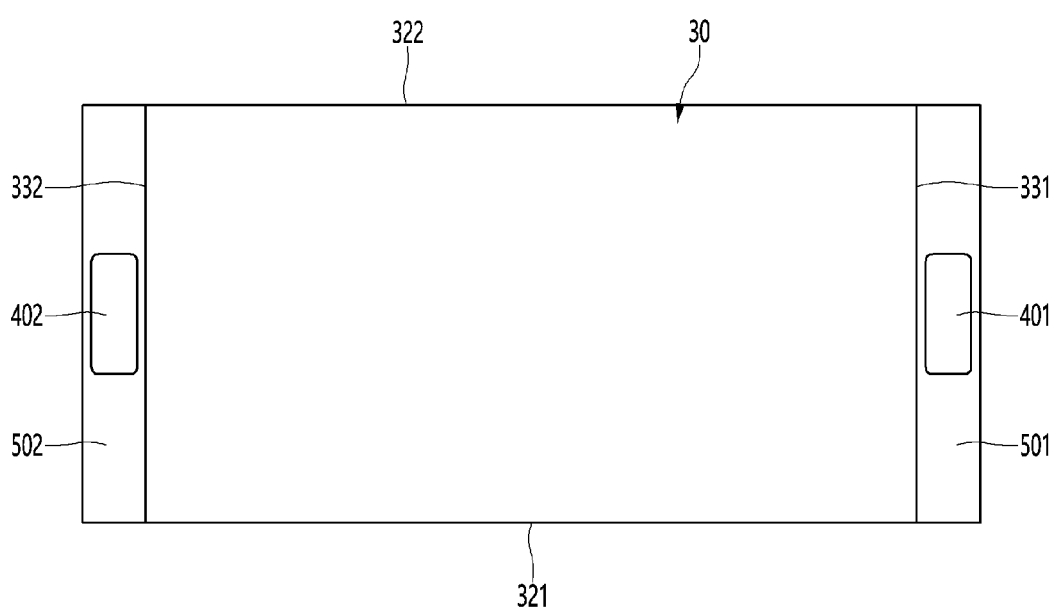
FIG. 11 is a view showing a second landscape mode state of a head including a speaker according to an embodiment of the present disclosure.

FIG. 10 is a view showing a first landscape mode state of a head including a speaker according to an embodiment of the present disclosure. FIG. 11 is a view showing a second landscape mode state of a head including a speaker according to an embodiment of the present disclosure.

Referring to FIG. 10, the first landscape mode may be a state in which a first speaker 401 is located on the left short side 331 of the display 31 and a second speaker 402 is located on the right short side 332 of the display 31.

Referring to FIG. 11, the second landscape mode may be a state in which the first speaker 401 is located on the right short side 331 of the display 31 and the second speaker 402 is located on the left short side 332 of the display 31.

The head 30 may include one or more speakers on a pair of short sides 331 and 332. The head 30 may include one or more speakers on the first short side 331 of the pair of short sides and include one or more speakers on the second short side 332.

Meanwhile, the head 30 may include a first speaker reception portion 501 for receiving the first speaker in the first short side 331 and include a second speaker reception portion 502 for receiving the second speaker 402 in the second short side 332.

In addition, the head 30 may include one or more first speakers 401 on the left short side 331 of the display and include one or more second speakers 402 on the right short side 331 in the landscape mode.

In addition, the display device 1 may include the sensor 140 for detecting the pivot of the head 30.

The sensor 140 may include at least one of an angle sensor, a tilt sensor or an acceleration sensor for detecting the rotation direction or rotation angle of the head 30.

Accordingly, the sensor 140 may detect the rotation direction and rotation angle of the head 30 when the head 30 pivots.

The processor 180 may determine whether the head 30 pivots based on the result of detection obtained from the sensor 140.

In addition, the processor 180 may determine a pivot state indicating whether the head 30 is in the landscape mode or the portrait mode. The pivot state may include a landscape mode state in which the long sides of the head 30 are in a horizontal state and a portrait mode state in which the long sides of the head 30 are in a vertical state.

In addition, the processor 180 may switch sound signals output by the first speaker 401 and the second speaker 402 when the pivot state of the head is switched.

The sound signal may include at least one of a left sound signal, a right sound signal, an upper sound signal, an upper left sound signal, an upper right sound signal, a mono sound signal or an woofer sound signal.

The sound signal may include a multi-channel audio signal. For example, the left sound signal may include at least one of a left stereo sound signal or a left surround sound signal. The right sound signal may include a right stereo sound signal or a right surround sound signal. The upper sound signal is a sound signal for configuring the stereoscopic sound field of audio and may be a sound signal for implementing a space sense of audio by outputting audio upward. For example, the upper sound signal may correspond to a 5.1.2-channel sound signal, and may mean a sound signal reflected from a ceiling. In addition, the upper left sound signal may include an upper left surround sound signal or an upper right stereo sound signal. The upper right sound signal may include an upper right surround sound signal or an upper right stereo sound signal.

Referring to FIG. 10, the processor 180 may control sound signals output from the first speaker 401 and the second speaker 402 based on the pivot state of the head 30. For example, the processor 180 may perform control such that the first speaker 401 located on the left short side 331 of the display 31 outputs the left surround sound signal or the left stereo sound signal in the landscape mode state of the head 30. In addition, the processor 180 may perform control such that the second speaker 402 located on the right short side 332 of the display 31 outputs the right surround sound signal or the right stereo sound signal in the landscape mode state of the head 30.

Meanwhile, when the head 30 pivots, the speakers may also move together to change the spatial locations thereof. Accordingly, it is necessary to switch the sound signals of the speakers, the spatial locations of which are changed, according to the pivot state of the head 30.

For example, the head 30 may pivot from the first landscape mode to the second landscape mode or from the second landscape mode to the first landscape mode. The head 30 may pivot between the first landscape mode and the second landscape mode by rotating 180 degrees clockwise or counterclockwise. In this case, the spatial locations of the speakers may be changed.

Referring to FIG. 11, the landscape mode state of the head may be the second landscape mode state pivoted in the first landscape mode state of the head 30 in FIG. 10.

In addition, the head 30 may be provided with one or more first speakers 401 on the right short side 331 of the display 31 and one or more second speakers 402 on the left short side 332, in the second landscape mode.

Meanwhile, when the head 30 pivots by rotating by 180 degrees, the processor 180 may switch the sound signal output from the first speaker 401 to be output by the second speaker 402 and switch the sound signal output from the second speaker 402 to be output by the first speaker 401.

For example, when the head 30 is in the first landscape mode state, the first speaker 401 may output the left surround sound signal and the second speaker 402 may output the right surround sound signal. When the head 30 pivots from the first landscape mode to the second landscape mode, the processor 180 may switch the left surround sound signal output from the first speaker 401 to be output by the second speaker 402 and switch the right surround sound signal output from the second speaker 402 to be output by the first speaker 401.

In addition, for example, when the head 30 is in the first landscape mode state, the first speaker 401 may output the left stereo sound signal, and the second speaker 402 may output the right stereo sound signal. When the head 30 pivots from the first landscape mode to the second landscape mode, the processor 180 may switch the left stereo sound signal output from the first speaker 401 to be output by the second speaker 402, and switch the right stereo sound signal output from the second speaker 402 to be output by the first speaker 401.

Accordingly, the processor 180 may switch and output the sound signals even when the head 30 pivots from the first landscape mode to the second landscape mode or from the second landscape mode to the first landscape mode, thereby maintaining the sound effect.

Figure 12:
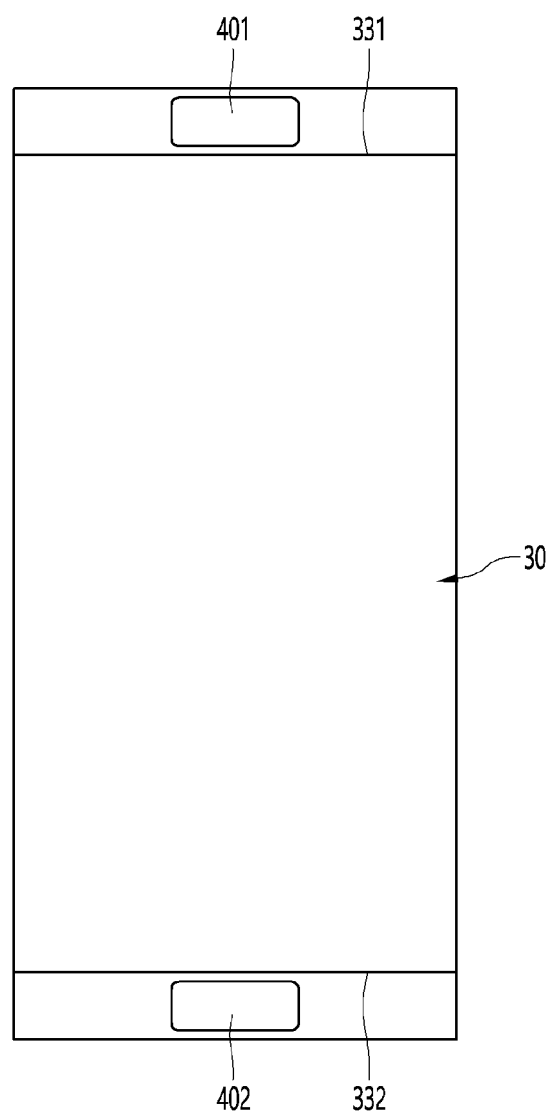
FIG. 12 is a view showing a first portrait mode state of a head including a speaker according to an embodiment of the present disclosure.
Figure 13:
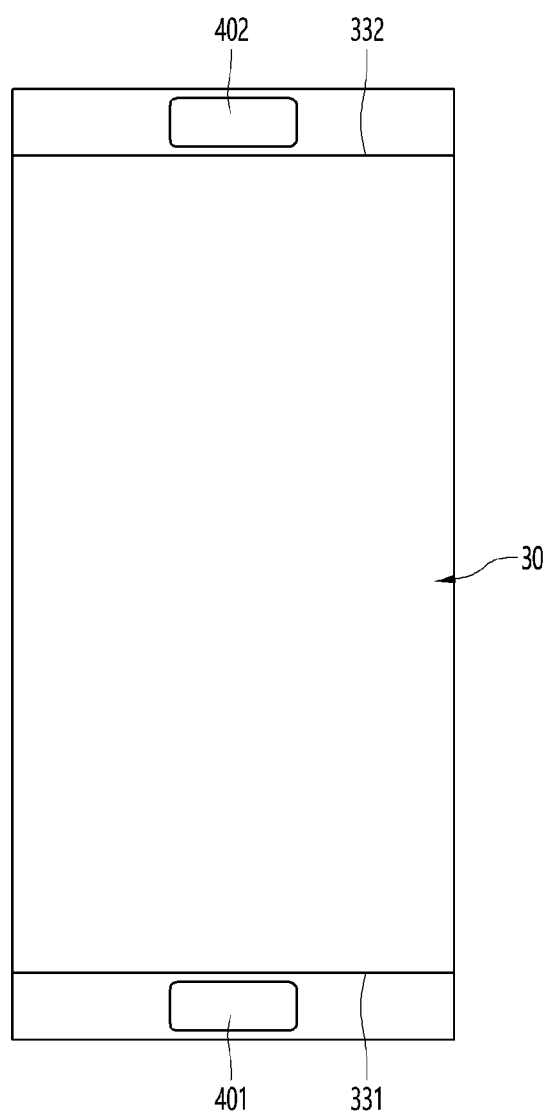
FIG. 13 is a view showing a second portrait mode state of a head including a speaker according to an embodiment of the present disclosure.

FIG. 12 is a view showing a first portrait mode state of a head including a speaker according to an embodiment of the present disclosure. FIG. 13 is a view showing a second portrait mode state of a head including a speaker according to an embodiment of the present disclosure.

Referring to FIG. 12, the first portrait mode may be a state in which the first speaker 401 is located on the upper short side 331 of the display 31 and the second speaker 402 is located on the lower short side 332 of the display 31. For example, the first portrait mode may be a state in which the head 30 pivots by rotating by 90 degrees clockwise in the first landscape mode.

Referring to FIG. 13, the second landscape mode may be a state in which the first speaker 401 is located on the lower short side 331 of the display 31 and the second speaker 402 is located on the upper short side 332 of the display 31. For example, the second portrait mode may be a state in which the head 30 pivots by rotating by 90 degrees counterclockwise in the first landscape mode.

The processor 180 may perform switching, such that the sound signals output from the first speaker 401 and the second speaker 402 when the head 30 is in the landscape mode and the sound signals output from the first speaker 401 and the second speaker 402 when the head 30 is in the portrait mode are differently output.

For example, the processor 180 may perform control such that the first speaker 401 outputs the left sound signal and the second speaker 402 outputs the right sound signal when the head 30 is in the first landscape mode. In addition, the processor 180 may switch the first speaker 401 to output the upper sound signal and switch the second speaker 402 to output the mono sound signal, when the head 30 rotates by 90 degrees clockwise in the first landscape mode to switch the pivot state to the first portrait mode. In addition, the processor 180 may switch the first speaker 401 to output the mono sound signal and switch the second speaker 402 to output the upper sound signal, when the head 30 rotates by 90 degrees counterclockwise in the first landscape mode to switch the pivot state to the second portrait mode.

Accordingly, the processor 180 may switch and output the sound signal by pivoting the head 30 from the landscape mode to the portrait mode, thereby maintaining the sound effect.

Meanwhile, the head 30 may include one or more third speakers on the upper long side and one or more fourth speakers on the lower long side.

Figure 14:
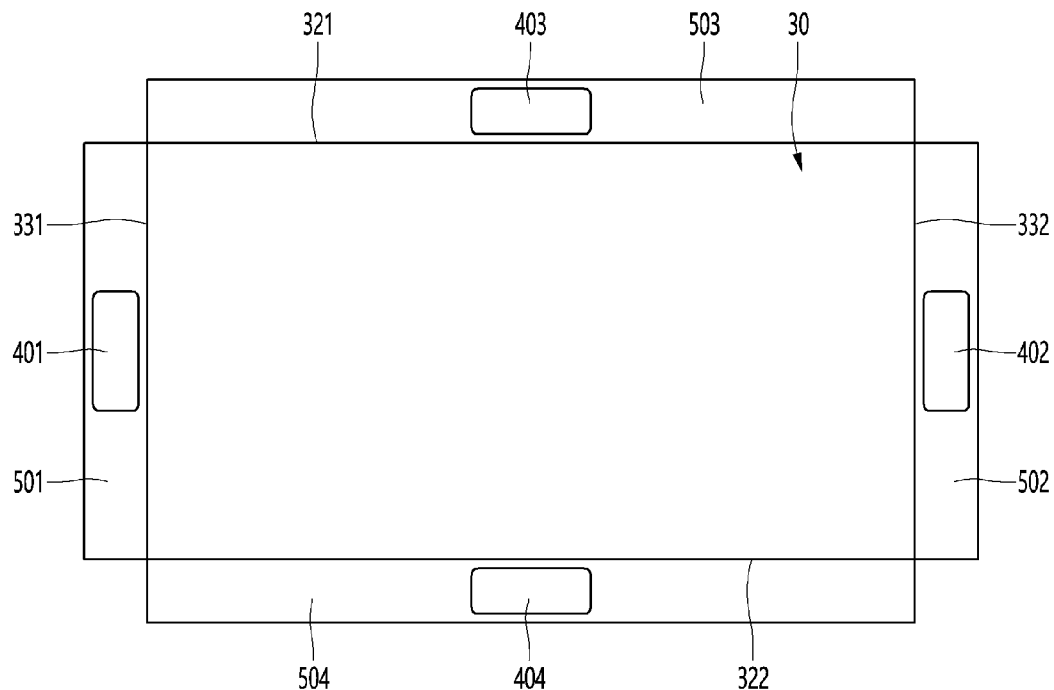
FIG. 14 is a view showing a first landscape mode state of a head including a speaker according to an embodiment of the present disclosure.
Figure 15:
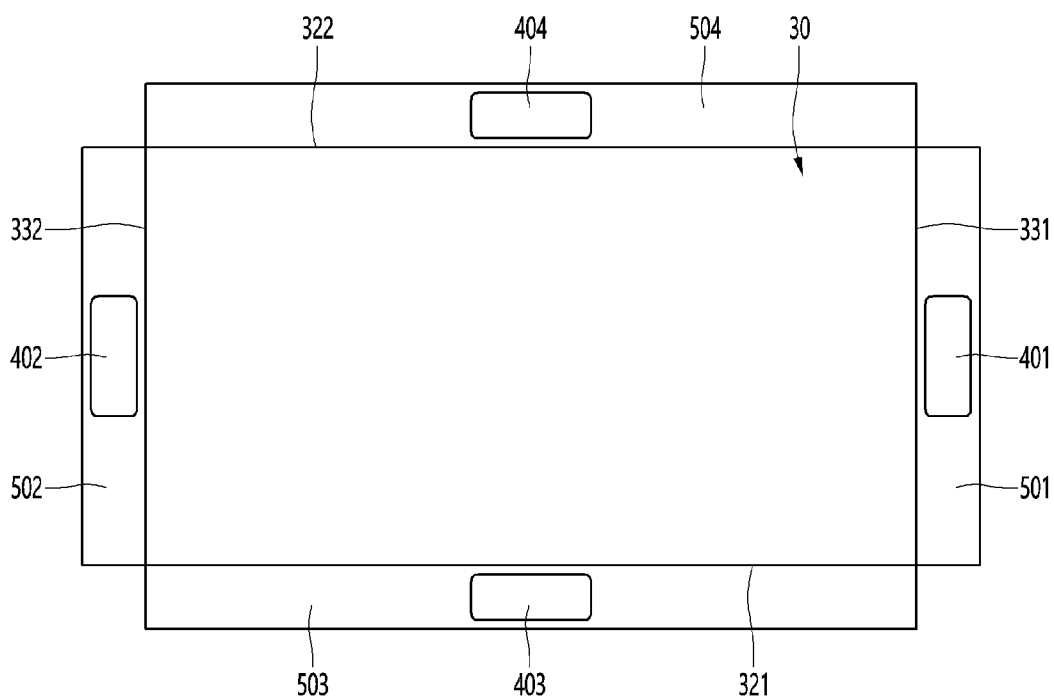
FIG. 15 is a view showing a second landscape mode state of a head including a speaker according to an embodiment of the present disclosure.

FIG. 14 is a view showing a first landscape mode state of a head including a speaker according to an embodiment of the present disclosure. FIG. 15 is a view showing a second landscape mode state of a head including a speaker according to an embodiment of the present disclosure.

Referring to FIG. 14, the first landscape mode may be a state in which the first speaker 401 is located on the left short side 331 of the display 31, the second speaker 402 is located on the right short side 332 of the display 31, the third speaker 403 is located on the upper long side 321 of the display 31, and the fourth speaker 404 is located on the lower long side 322 of the display 31.

Referring to FIG. 15, the second landscape mode may be a state in which the first speaker 401 is located on the right short side 331 of the display 31, the second speaker 402 is located on the left short side 332 of the display 31, the third speaker 403 is located on the lower long side 321 of the display 31, and the fourth speaker 404 is located on the upper long side 322 of the display 31.

The head 30 may include one or more speakers on a pair of long sides 321 and 322. The head 30 may include one or more speakers on the first long side 321 of a pair of long sides and one or more speakers on the second long side 322.

Meanwhile, the head 30 may include a third speaker reception portion 503 for receiving the first speaker 403 in the first long side 321 and a second speaker reception portion 504 for receiving the fourth speaker 404 in the second long side 322.

The processor 180 may perform switching, such that the sound signals output from the third speaker 403 and the fourth speaker 404 when the head 30 is in the landscape mode and the sound signals output from the third speaker 403 and the fourth speaker 404 when the head 30 is in the portrait mode are differently output.

Meanwhile, the processor 180 may switch the sound signal output from the third speaker 403 to be output by the fourth speaker 404 and switch the sound signal output from the fourth speaker 404 to be output by the third speaker, when the head 30 pivots by rotating by 180 degrees.

For example, when the head 30 is in the first landscape mode state, the third speaker 403 may output the upper sound signal and the fourth speaker 404 may output the mono sound signal. The processor 180 may switch the upper sound signal output from the third speaker 403 to be output by the fourth speaker 404 and switch the mono sound signal output from the fourth speaker 404 to be output by the third speaker 403, when the head 30 pivots from the first landscape mode to the second landscape mode.

Figure 16:
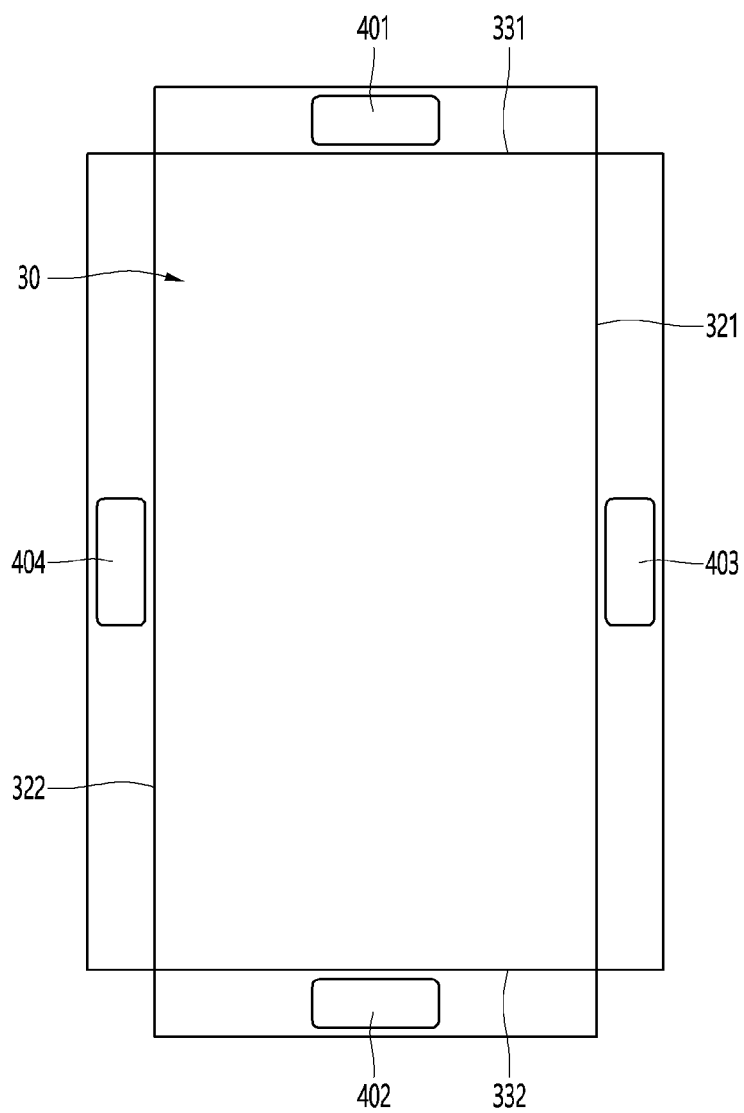
FIG. 16 is a view showing a first portrait mode state of a head including a speaker according to an embodiment of the present disclosure.
Figure 17:
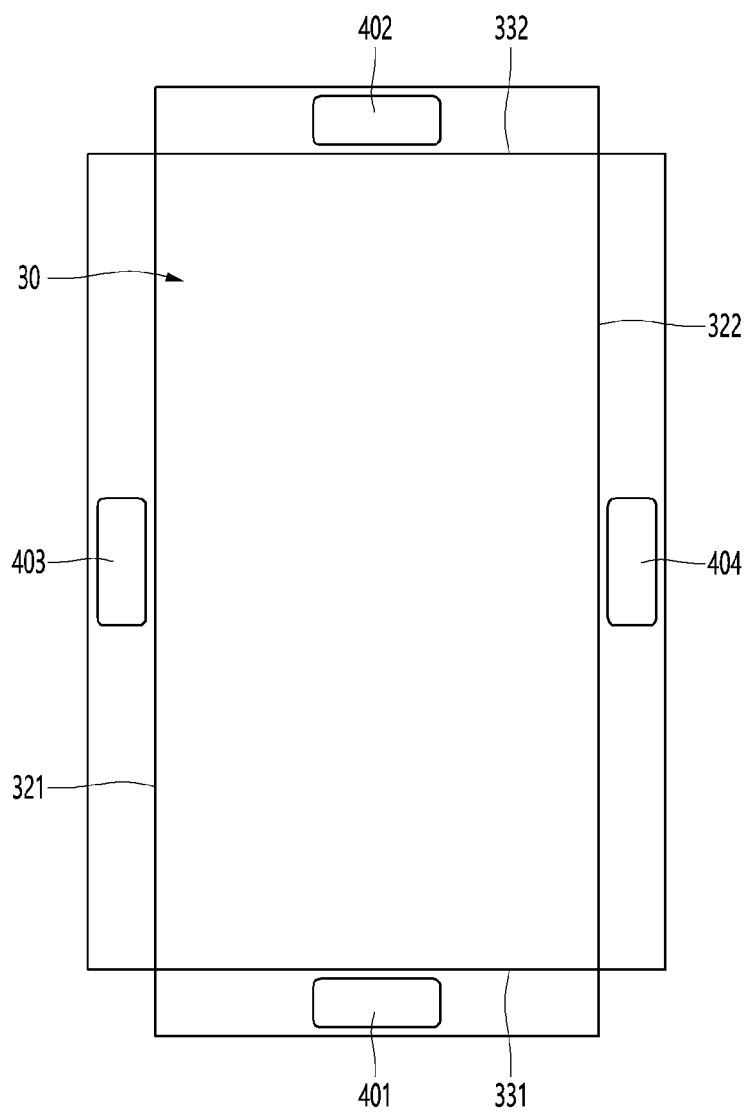
FIG. 17 is a view showing a second portrait mode state of a head including a speaker according to an embodiment of the present disclosure.

FIG. 16 is a view showing a first portrait mode state of a head including a speaker according to an embodiment of the present disclosure. FIG. 17 is a view showing a second portrait mode state of a head including a speaker according to an embodiment of the present disclosure.

Referring to FIG. 16, the first portrait mode may be a state in which the third speaker 403 is located on the right long side 321 of the display 31 and the fourth speaker 404 is located on the left long side 322 of the display 31. For example, the first portrait mode may be a state in which the head 30 pivots by rotating by 90 degrees clockwise in the first landscape mode.

Referring to FIG. 17, the second portrait mode may be a state in which the third speaker 403 is located on the left long side 321 of the display 31 and the fourth speaker 404 is located on the right long side 322 of the display 31. For example, the second portrait mode may be a state in which the head 30 pivots by rotating by 90 degrees counterclockwise in the first landscape mode.

Meanwhile, the processor 180 may perform switching, such that the sound signals output from the third speaker 403 and the fourth speaker 404 when the head 30 is in the landscape mode and the sound signals output from the third speaker 403 and the fourth speaker 404 when the head 30 is in the portrait mode are differently output.

For example, the processor 180 may perform control such that the third speaker 403 outputs the upper sound signal and the fourth speaker 404 outputs the mono sound signal, when the head 30 is in the first landscape mode. In addition, the processor 180 may switch the third speaker 403 to output the right sound signal and switch the fourth speaker 404 to output the left sound signal, when the head 30 rotates by 90 degrees clockwise in the first landscape mode to switch the pivot state to the first portrait mode. In addition, the processor 180 may switch the third speaker 403 to output the left sound signal and switch the fourth speaker 404 to output the right sound signal, when the head 30 rotates by 90 degrees counterclockwise in the first landscape mode to switch the pivot state to the second portrait mode.

Accordingly, the processor 180 may switch and output the sound signal even when the head 30 pivots from the landscape mode to the portrait mode to change the spatial locations of the speakers, thereby maintaining the sound effect.

Meanwhile, the sensor 140 may detect the pivot direction and pivot angle of the head.

The processor 180 may determine the switch state of the pivot state of the head 30 based on the pivot direction and the pivot angle detected by the sensor 140. The processor 180 may determine a state switched from a pre-pivot state of the head 30 (the first landscape mode, the second landscape mode, the first portrait mode and the second portrait mode) to a post-pivot state (the first landscape mode, the second landscape mode, the first portrait mode and the second portrait mode).

In addition, the processor 180 may control the sound signals output from the speakers after pivot, such that the spatial locations of the sound signals output from the speakers before pivot match the spatial locations of the sound signals output from the speakers after pivot.

The spatial locations may be divided into the left side, the upper side, the right side and the lower side of the display 31, the left side and the right side may be subdivided into an upper side, a middle side and a lower side, and the upper side and the lower side may be subdivided into an left side, a middle side and a right side.

Referring to FIGS. 14 and 16, the head 30 may pivot from the first landscape mode to the first portrait mode. The sensor 140 may detect the pivot direction and pivot angle of the head 30, and the processor 180 may determine that the head 30 pivots from the first landscape mode to the first portrait mode based on the pivot direction and the pivot angle.

In addition, the processor 180 may perform control such that the sound signal output by the first speaker 401 located on the left side of the space before pivot is output by the third speaker 403 located on the left side of the space after pivot. In addition, the processor 180 may perform control such that the sound signal output by the second speaker 402 located on the right side of the space before pivot is output by the fourth speaker 404 located on the right side of the space after pivot. In addition, the processor 180 may perform control such that the sound signal output by the third speaker 403 located on the upper side of the space before pivot is output by the first speaker 401 located on the upper side of the space after pivot. In addition, the processor 180 may perform control such that the sound signal output by the fourth speaker 404 located on the lower side of the space before pivot is output by the second speaker 402 located on the lower side of the space after pivot.

After, the processor 180 may perform control such that the plurality of speakers, the locations of which are moved due to pivot of the head 30, outputs the sound signals according to the spatial locations thereof after pivot, thereby implementing natural stereoscopic sound despite pivot of the head 30.

In addition, referring to FIGS. 14 and 16, the processor 180 may switch the sound signal output from the first speaker 401 to be output by the fourth speaker 404, switch the sound signal output from the second speaker 402 to be output by the third speaker 403, switch the sound signal output from the third speaker 403 to be output by the first speaker 401, and switch the sound signal output from the fourth speaker 404 to be output by the second speaker 402, when the head 30 rotates by 90 degrees clockwise to switch the pivot state from the first landscape mode to the first portrait mode.

In addition, referring to FIGS. 14 and 17, the processor 180 may switch the sound signal output from the first speaker 401 to be output by the third speaker 403, switch the sound signal output from the second speaker 402 to be output by the fourth speaker 404, switch the sound signal output from the third speaker 403 to be output by the second speaker 402, and switch the sound signal output from the fourth speaker 404 to be output by the first speaker 401, when the head 30 rotates by 90 degrees counterclockwise to switch the pivot state from the first landscape mode to the second portrait mode.

Figure 18:
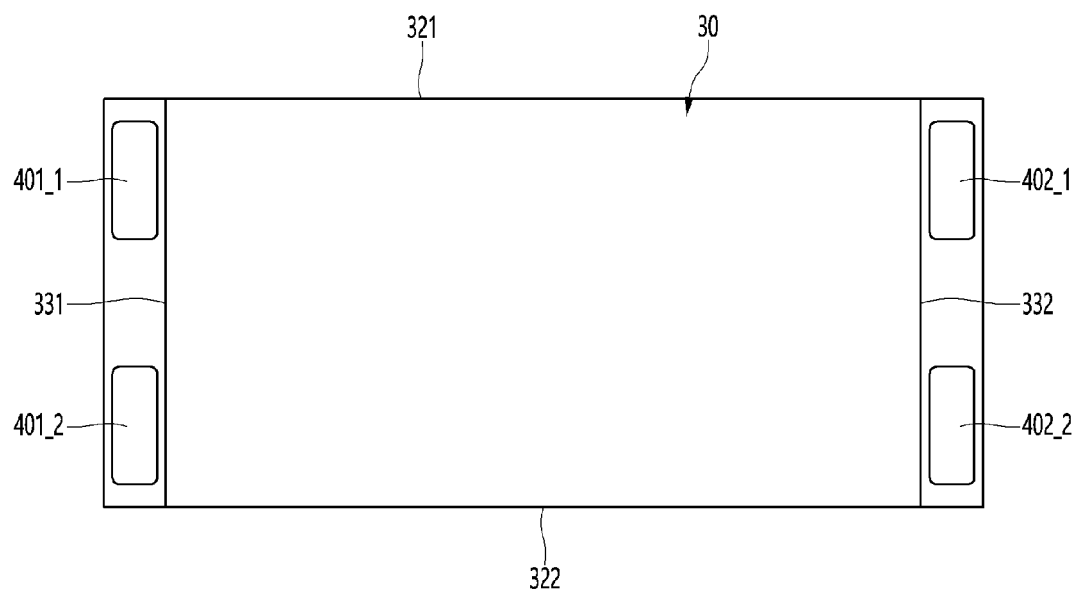
FIG. 18 is a view showing a first landscape mode state of a head including a speaker according to an embodiment of the present disclosure.
Figure 19:
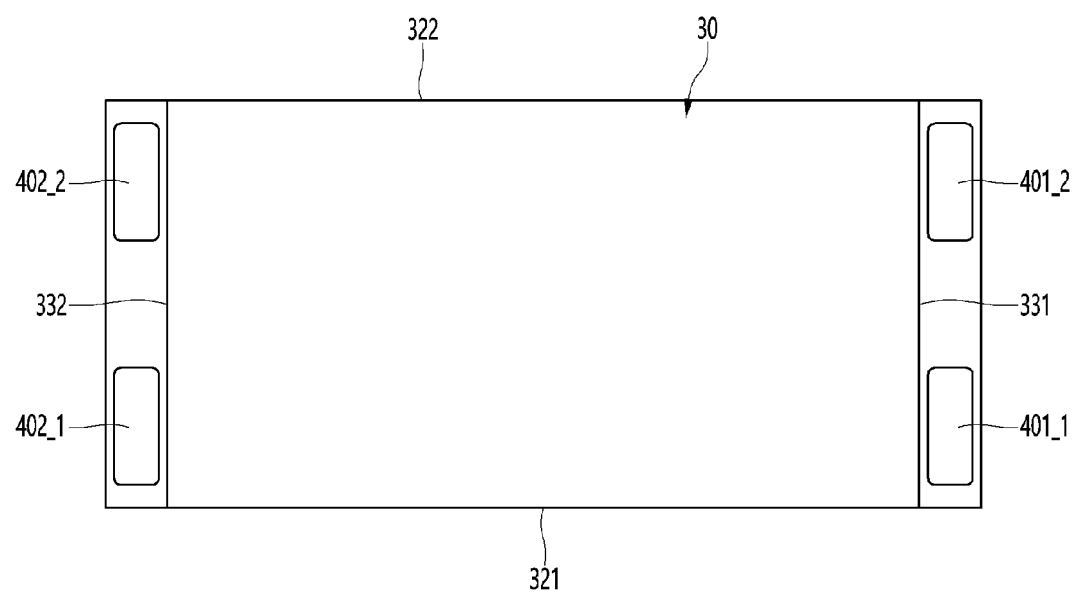
FIG. 19 is a view showing a second landscape mode state of a head including a speaker according to an embodiment of the present disclosure.

FIG. 18 is a view showing a first landscape mode state of a head including a speaker according to an embodiment of the present disclosure. FIG. 19 is a view showing a second landscape mode state of a head including a speaker according to an embodiment of the present disclosure.

Referring to FIG. 18, based on the case where the head 30 is in the first landscape mode state, the plurality of first speakers 401 may include a first upper speaker 401_1 disposed on the upper side of the left short side 331 and a first lower speaker 401_2 disposed on the lower side of the left short side 331, and the plurality of second speakers 402 may include a second upper speaker 402_1 disposed on the upper side of the right short side 332 and a second lower speaker 402_2 disposed on the lower side of the right short side 332.

In addition, referring to FIG. 19, based on the case where the head 30 is in the second landscape mode state, the first lower speaker 401_2 may be disposed on the upper side of the right short side 331, the first upper speaker 401_1 may be disposed on the lower side of the right short side 331, the second lower speaker 402_2 may be disposed on the upper side of the left short side 332, and the second upper speaker 402_1 may be disposed on the lower side of the left short side 332.

In addition, the processor 180 may control the sound signals output from the speakers after pivot, such that the spatial locations of the sound signals output from the speaker before pivot match those of the sound signals output from the speakers after pivot.

Figure 20:
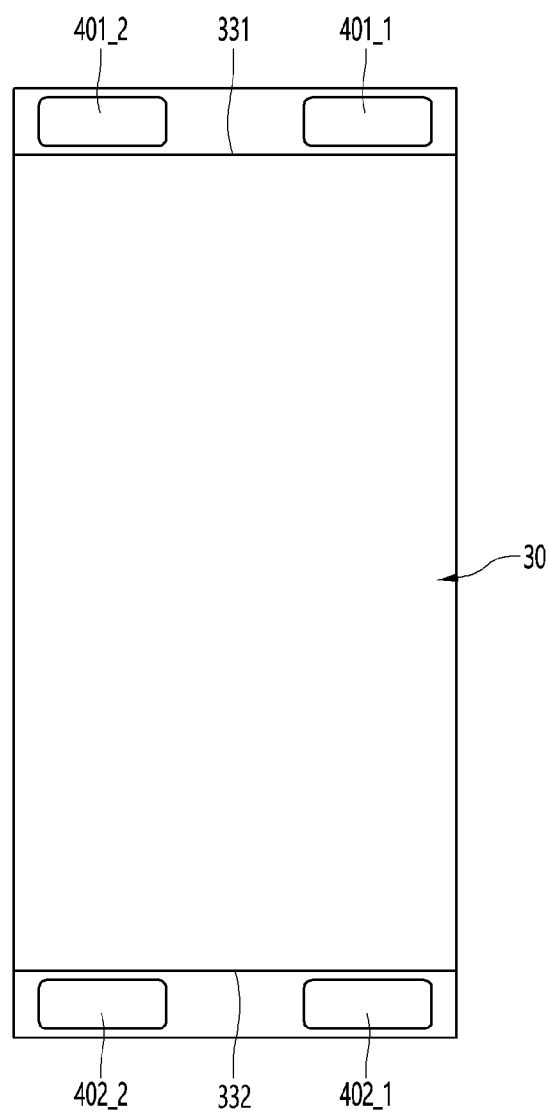
FIG. 20 is a view showing a first portrait mode state of a head including a speaker according to an embodiment of the present disclosure.
Figure 21:
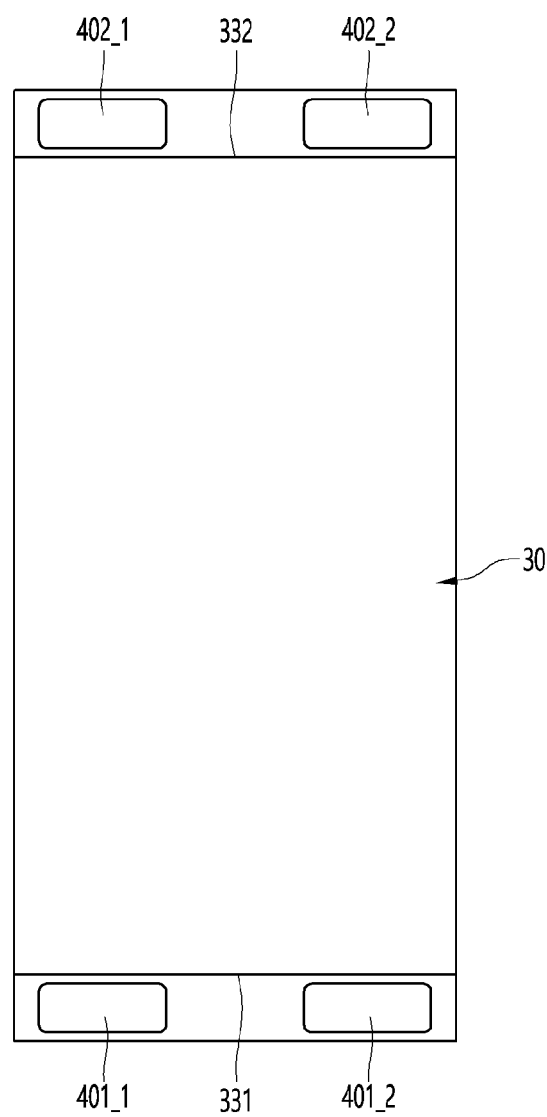
FIG. 21 is a view showing a second portrait mode state of a head including a speaker according to an embodiment of the present disclosure.

FIG. 20 is a view showing a first portrait mode state of a head including a speaker according to an embodiment of the present disclosure. FIG. 21 is a view showing a second portrait mode state of a head including a speaker according to an embodiment of the present disclosure.

The processor 180 may perform switching, such that the sound signals output from the first upper speaker 401_1, the first lower speaker 401_2, the second upper speaker 402_1 and the second lower speaker 402_2 are differently output, when the head 30 is in the landscape mode or the portrait mode.

For example, when the head 30 is in the first landscape mode, the processor 180 may perform control such that the first upper speaker 401_1 and the first lower speaker 401_2 output the left sound signal and the second upper speaker 402_1 and the second lower speaker 402_2 output the right sound signal. In addition, when the head 30 rotates by 90 degrees clockwise in the first landscape mode to switch the pivot state to the first portrait mode, the processor 180 may control the first upper speaker 401_1 to output the upper right sound signal, control the first lower speaker 401_2 to output the upper left sound signal, control the second upper speaker 402_1 to output the right sound signal or the mono sound, and control the second lower speaker 402_2 to output the left sound signal or the mono sound.

In addition, when the head 30 rotates by 90 degrees counterclockwise in the first landscape mode to switch the pivot state to the second portrait mode, the processor 180 may control the first upper speaker 401_1 to output the left sound signal or the mono sound signal, control the first lower speaker 401_2 to output the right sound signal or the mono sound signal, control the second upper speaker 402_1 to output the upper left sound signal, and control the second lower speaker 402_2 to output the upper right sound signal.

Accordingly, the processor 180 may perform control to switch and output the sound signals even when the head 30 pivots from the landscape mode to the portrait mode to change the spatial locations of the speakers, thereby maintaining the sound effect.

Meanwhile, the head 30 may further include a third left speaker disposed on the left side of the upper long side, a third right speaker disposed on the right side of the upper long side, a fourth left speaker disposed on the left side of the lower long side and a fourth right speaker disposed on the right side of the lower long side.

Figure 22:
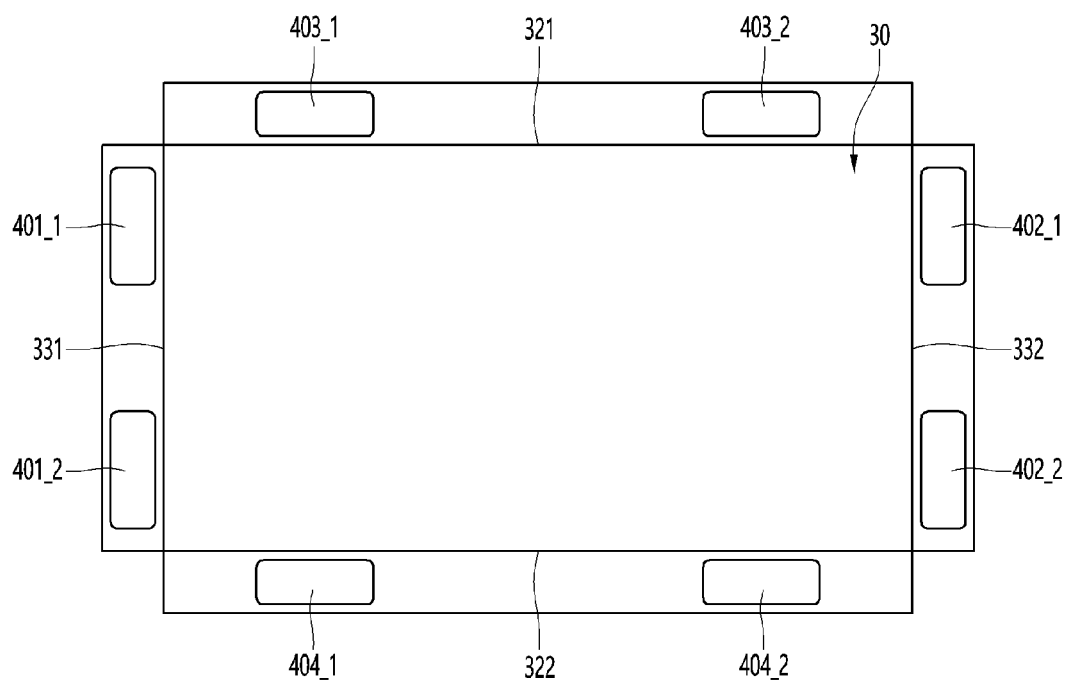
FIG. 22 is a view showing a first landscape mode state of a head including a speaker according to an embodiment of the present disclosure.
Figure 23:
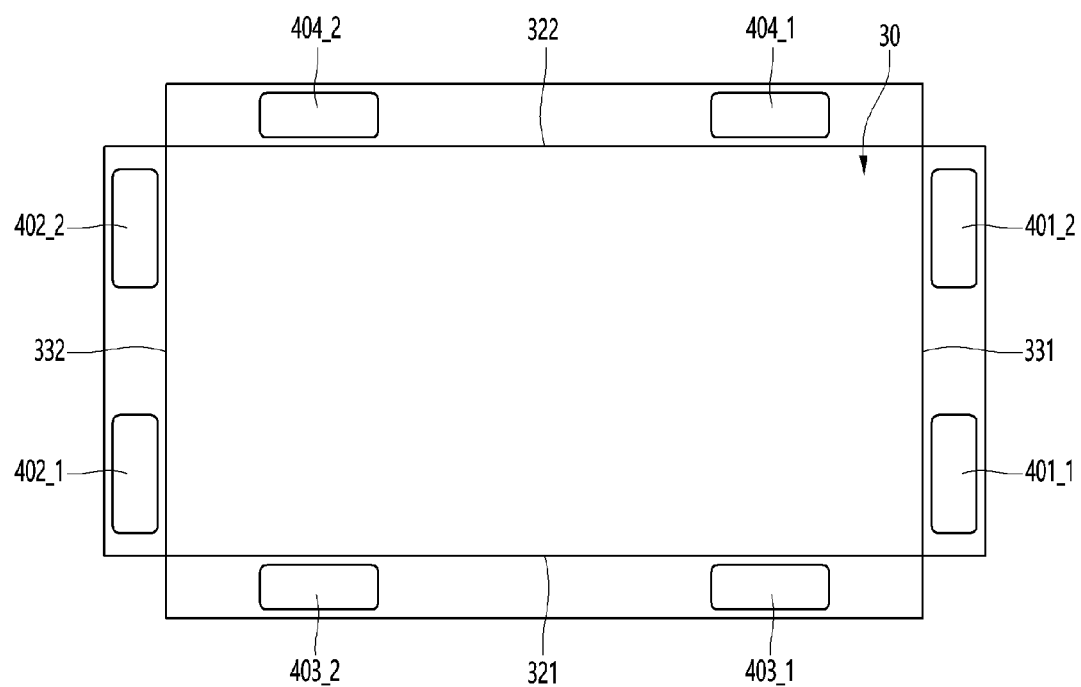
FIG. 23 is a view showing a second landscape mode state of a head including a speaker according to an embodiment of the present disclosure.

FIG. 22 is a view showing a first landscape mode state of a head including a speaker according to an embodiment of the present disclosure. FIG. 23 is a view showing a second landscape mode state of a head including a speaker according to an embodiment of the present disclosure.

Referring to FIG. 22, based on the state in which the head is in the first landscape mode state, the plurality of third speakers 403 may include a third left speaker 403_1 disposed on the left side of the upper long side 321 and the first lower speaker 401_2 located on the lower side of the left short side 331, and the plurality of second speakers 402 may include the second upper speaker 402_1 disposed on the upper side of the right short side 332 and the second lower speaker 402_2 located on the lower side of the right short side 332. In this case, the processor 180 may perform control such that the first upper speaker 401_1 outputs the left surround sound signal, the first lower speaker 401_2 outputs the left stereo sound signal or the left surround sound signal, the second upper speaker 402_1 outputs the right surround sound signal, the second lower speaker 402_2 outputs the right stereo sound signal or the right surround sound signal, the third left speaker 403_1 outputs the upper left surround sound signal, the third right speaker 403_2 outputs the upper right surround sound signal, the fourth left speaker 404_1 outputs the left stereo sound signal or the mono sound signal, and the fourth right speaker 404_2 outputs the right stereo sound signal or the mono sound signal.

In addition, referring to FIG. 23, based on the case where the head 30 is in the second landscape mode state, the fourth right speaker 404_2 may be disposed on the left side of the upper long side 322, the fourth left speaker 404_1 may be disposed on the right side of the upper long side 322, the third right speaker 403_2 may be disposed on the left side of the lower long side 331, and the third left speaker 403_1 may be disposed on the right side of the lower long side 331.

Meanwhile, the processor 180 may control the sound signals output from the speakers after pivot, such that the spatial locations of the sound signals output from the speakers before pivot match those of the sound signals output from the speakers after pivot.

Accordingly, by performing control to switch and output the sound signals even when the head 30 pivots from the first landscape mode to the second landscape mode to change the spatial locations of the speakers, it is possible to maintain the sound effect.

Figure 24:
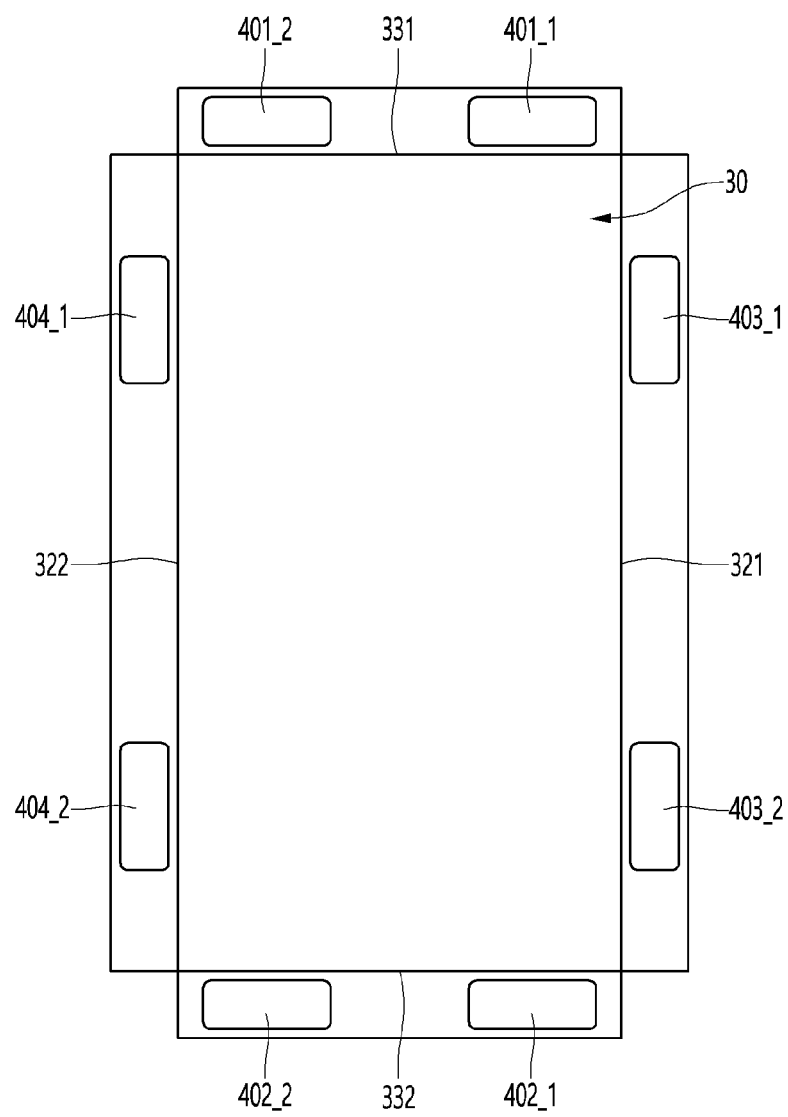
FIG. 24 is a view showing a first portrait mode state of a head including a speaker according to an embodiment of the present disclosure.
Figure 25:
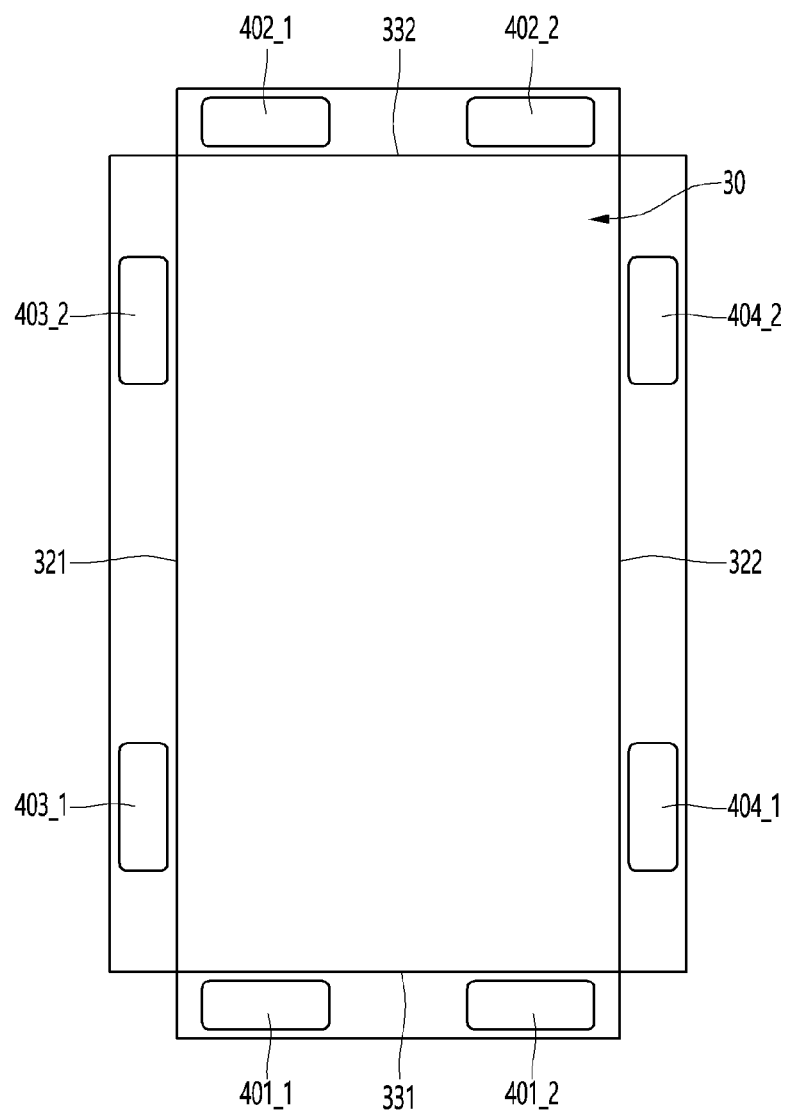
FIG. 25 is a view showing a second portrait mode state of a head including a speaker according to an embodiment of the present disclosure.

FIG. 24 is a view showing a first portrait mode state of a head including a speaker according to an embodiment of the present disclosure. FIG. 25 is a view showing a second portrait mode state of a head including a speaker according to an embodiment of the present disclosure.

Referring to FIG. 24, when the head 30 rotates by 90 degrees clockwise to change the pivot state from the first landscape mode to the first portrait mode, the processor 180 may perform control such that the third left speaker 403_1 and the third right speaker 403_2 output the right sound signal and the fourth left speaker 404_1 and the fourth right speaker 404_2 output the left sound signal.

For example, when the head 30 rotates by 90 degrees clockwise to change the pivot state from the first landscape mode to the first portrait mode, the processor 180 may perform control such that the third left speaker 403_1 outputs the right surround sound signal, the third right speaker 403_2 outputs the right surround sound signal or the right stereo sound signal, and perform control such that the fourth left speaker 404_1 outputs the left surround sound signal and the fourth right speaker 404_2 outputs the left surround sound signal or the left stereo sound signal.

Referring to FIG. 25, when the head 30 rotates by 90 degrees counterclockwise to change the pivot state from the first landscape mode to the second portrait mode, the processor 180 may perform control such that the third left speaker 403_1 and the third right speaker 403_2 output the left sound signal and perform control such that the fourth left speaker 404_1 and the fourth right speaker 404_2 output the right sound signal.

For example, when the head 30 rotates by 90 degrees counterclockwise to change the pivot state from the first landscape mode to the second portrait mode, the processor 180 may perform control such that the third left speaker 403_1 outputs the left surround sound signal or the left stereo sound signal and the third right speaker 403_2 outputs the left surround sound signal, and perform control such that the fourth left speaker 404_1 outputs the right surround sound signal or the right stereo sound signal and the fourth right speaker 404_2 outputs the right surround sound signal.

Meanwhile, the head 30 of the display device 1 may include a plurality of panel speakers attached to the panel of the display 31. The panel speakers may generate sound by causing vibration of the panel through an exciter.

The processor 180 may determine the pivot state indicating whether the head 30 is in the landscape mode or the portrait mode, based on the result of detection of the sensor 140 for detecting the pivot of the head 30 and switch the sound signals output from the plurality of panel speakers when the pivot state of the head 30 is switched.

Figure 26:
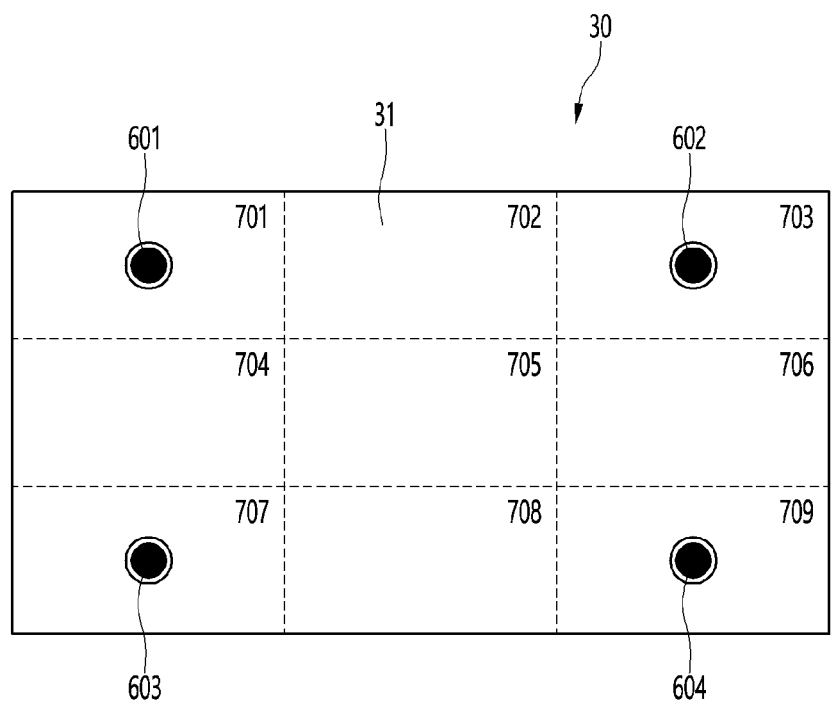
FIG. 26 is a view showing a landscape mode state of a head including a panel speaker according to an embodiment of the present disclosure.
Figure 27:
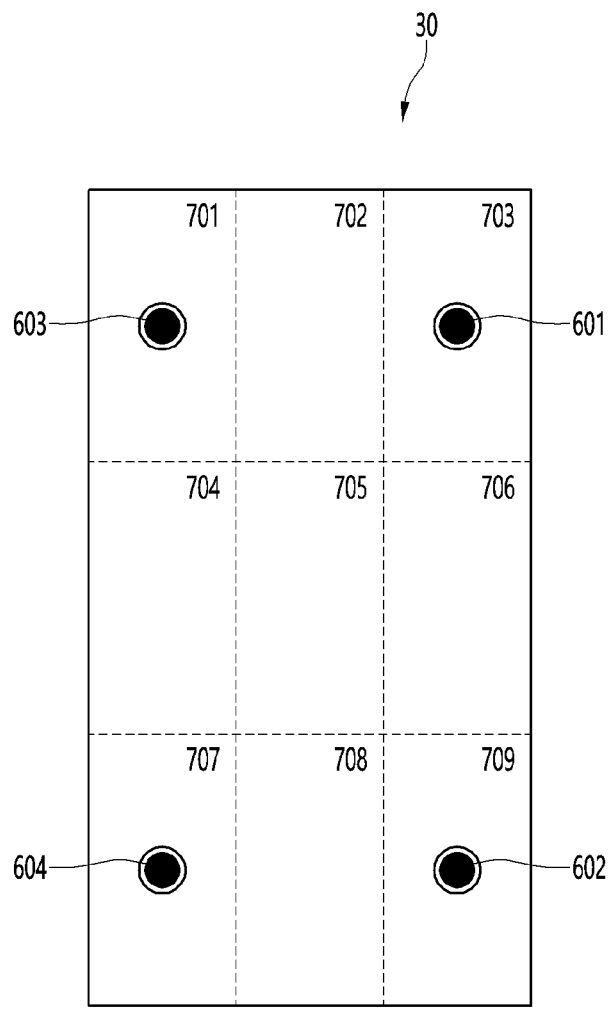
FIG. 27 is a view showing a portrait mode state of a head including a panel speaker according to an embodiment of the present disclosure.

FIG. 26 is a view showing a landscape mode state of a head including a panel speaker according to an embodiment of the present disclosure. FIG. 27 is a view showing a portrait mode state of a head including a panel speaker according to an embodiment of the present disclosure.

The processor 180 may determine the spatial locations of the panel speakers based on the pivot direction and pivot angle detected by the sensor 140 and perform control such that the panel speakers output the sound signals set according to the spatial arrangement of the panel speakers.

The spatial locations of the display 31 may be divided into 9 regions, and the number of regions is not limited thereto. For example, the divided nine regions may include an upper left region 701, an upper middle region 702, an upper right region 703, a left middle region 704, a central region 705, a right middle region 706, a lower left region 707, a lower middle region 708 and a lower right region 709 in the display 31 of the head 30 in the landscape mode or the portrait mode.

Referring to FIG. 26, the processor 180 may perform control such that the first panel speaker 401 located in the upper left region 701 outputs the left surround sound signal or the upper left surround sound signal. In addition, the processor 180 may perform control such that the second panel speaker 602 located in the upper right region 703 outputs the right surround sound signal or the upper right surround sound signal. In addition, the processor 180 may perform control such that the third panel speaker 603 located in the lower left region 707 outputs the left stereo sound signal or the left surround sound signal. In addition, the processor 180 may perform control such that the fourth panel speaker 604 located in the lower right region 709 outputs the right stereo sound signal or the right surround sound signal.

Referring to FIG. 27, when the head 30 pivots to the portrait mode state by rotating by 90 degrees clockwise in the landscape mode state of FIG. 26, the processor 180 may perform control such that the third panel speaker 603 located in the upper left region 701 outputs the left surround sound signal or the upper left surround sound signal. In addition, the processor 180 may perform control such that the first panel speaker 601 located in the upper right region 703 outputs the right surround sound signal or the upper right surround sound signal. In addition, the processor 180 may perform control such that the fourth panel speaker 604 located in the lower left region 707 outputs the left stereo sound signal or the left surround sound signal. In addition, the processor 180 may perform control such that the second panel speaker 602 located in the lower right region 709 outputs the right stereo sound signal or the right surround sound signal.

Accordingly, the processor 180 may switch the sound signals output from the panel speakers before pivot to be output by the panel speakers after pivot based on the pivot direction and pivot angle of the head 30, such that the spatial locations of the sound signals output before pivot and after pivot may match each other.

In addition, the processor 180 may determine the spatial locations of the panel speakers based on the pivot direction and pivot angle of the head 30 and perform control such that the panel speakers output the sound signals set according to spatial arrangement of the panel speakers.

Figure 28:
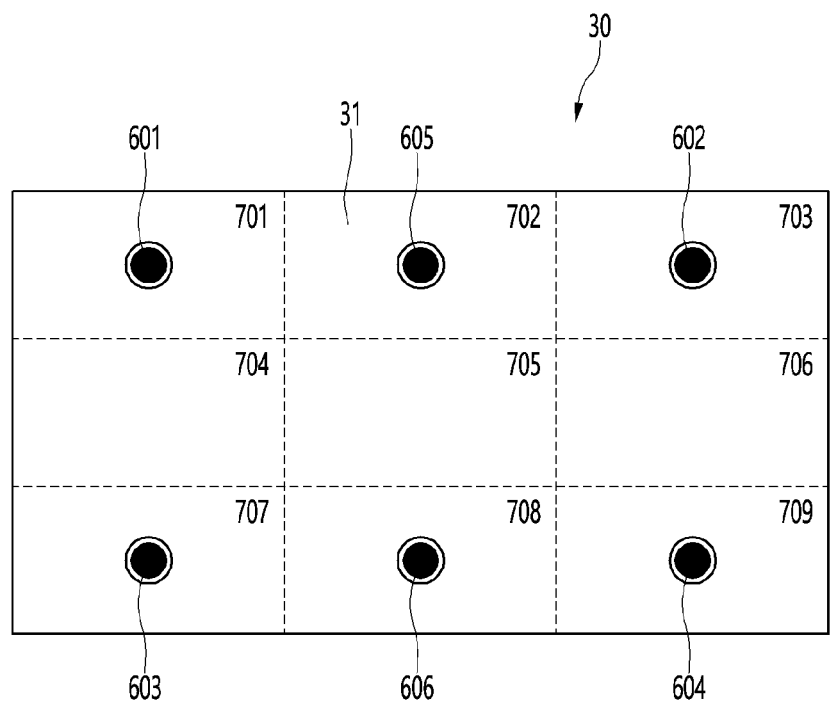
FIG. 28 is a view showing a landscape mode state of a head including a panel speaker according to an embodiment of the present disclosure.
Figure 29:
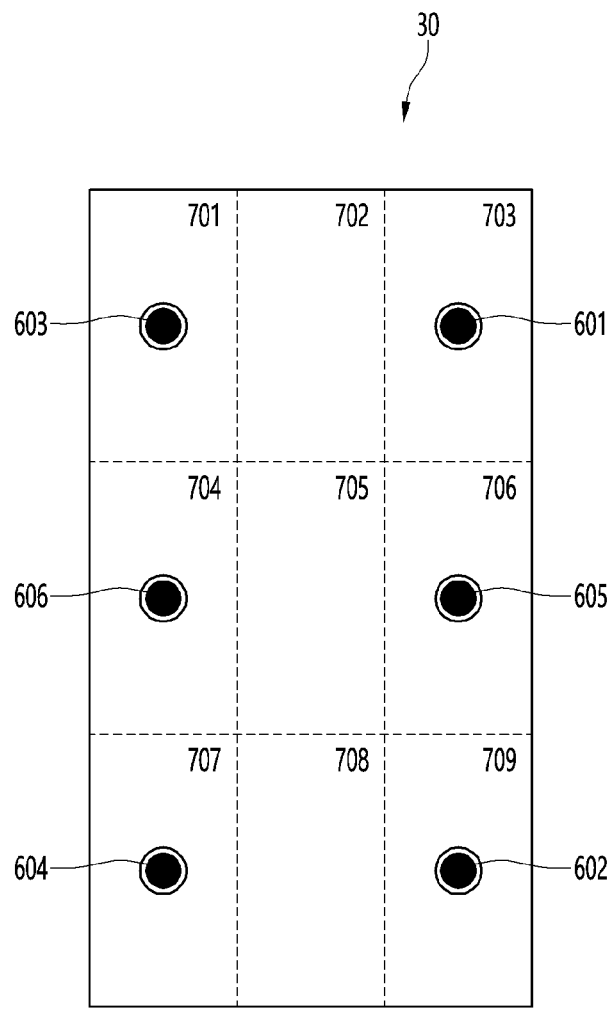
FIG. 29 is a view showing a portrait mode state of a head including a panel speaker according to an embodiment of the present disclosure.
Figure 30:
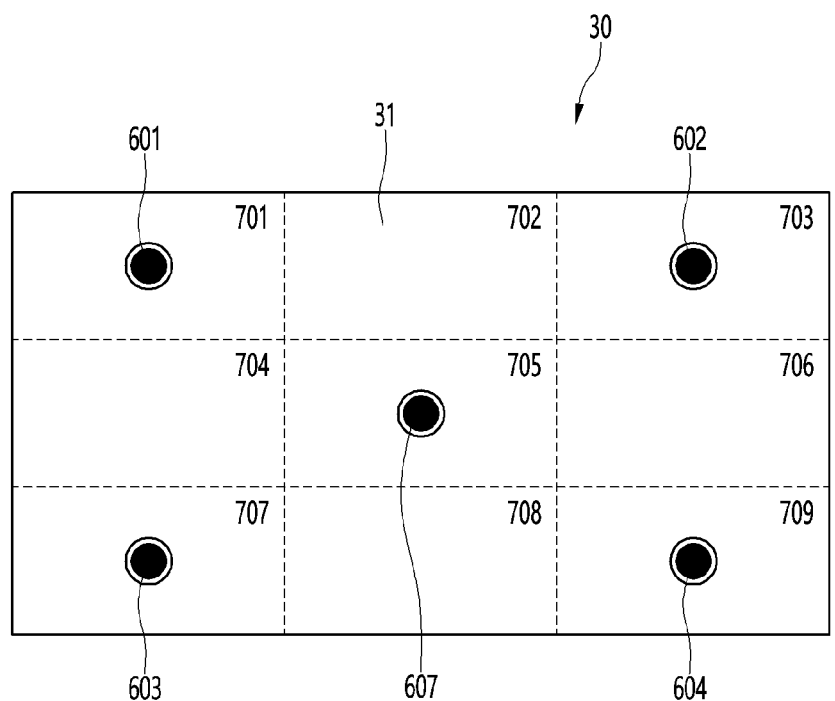
Figure 31:
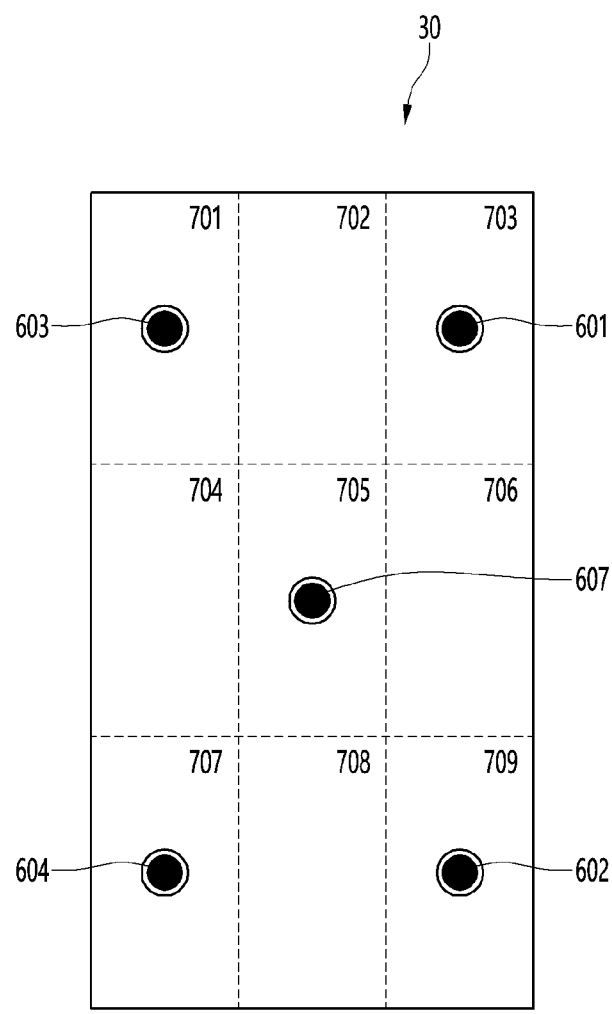

FIG. 28 is a view showing a landscape mode state of a head including a panel speaker according to an embodiment of the present disclosure. FIG. 29 is a view showing a portrait mode state of a head including a panel speaker according to an embodiment of the present disclosure.

Referring to FIG. 28, when the head 30 is in the landscape mode, if the fifth panel speaker 605 is located in the upper middle region 702, the processor 180 may perform control such that the fifth panel speaker 605 outputs the upper surround sound signal or the upper sound signal. In addition, when the head 30 is in the landscape mode, if the sixth panel speaker 606 is located in the upper middle region 702, the processor 180 may perform control such that the sixth panel speaker 606 outputs the mono sound signal.

Referring to FIG. 29, when the head 30 is in the portrait mode, if the fifth panel speaker 605 is located in the right middle region 706, the processor 180 may perform control such that the fifth panel speaker 605 outputs the right surround sound signal or the right stereo sound signal. In addition, when the head 30 is in the portrait mode, if the sixth panel speaker 606 is located in the left middle region 704, the processor 180 may perform control such that the sixth panel speaker 606 outputs the left surround sound signal or the left stereo sound signal.

Accordingly, the processor 180 may determine the spatial locations of the panel speakers based on the pivot direction and pivot angle of the head 30 and perform control such that the panel speakers output the sound signals set according to the spatial arrangement of the panel speakers.

Figure 32:
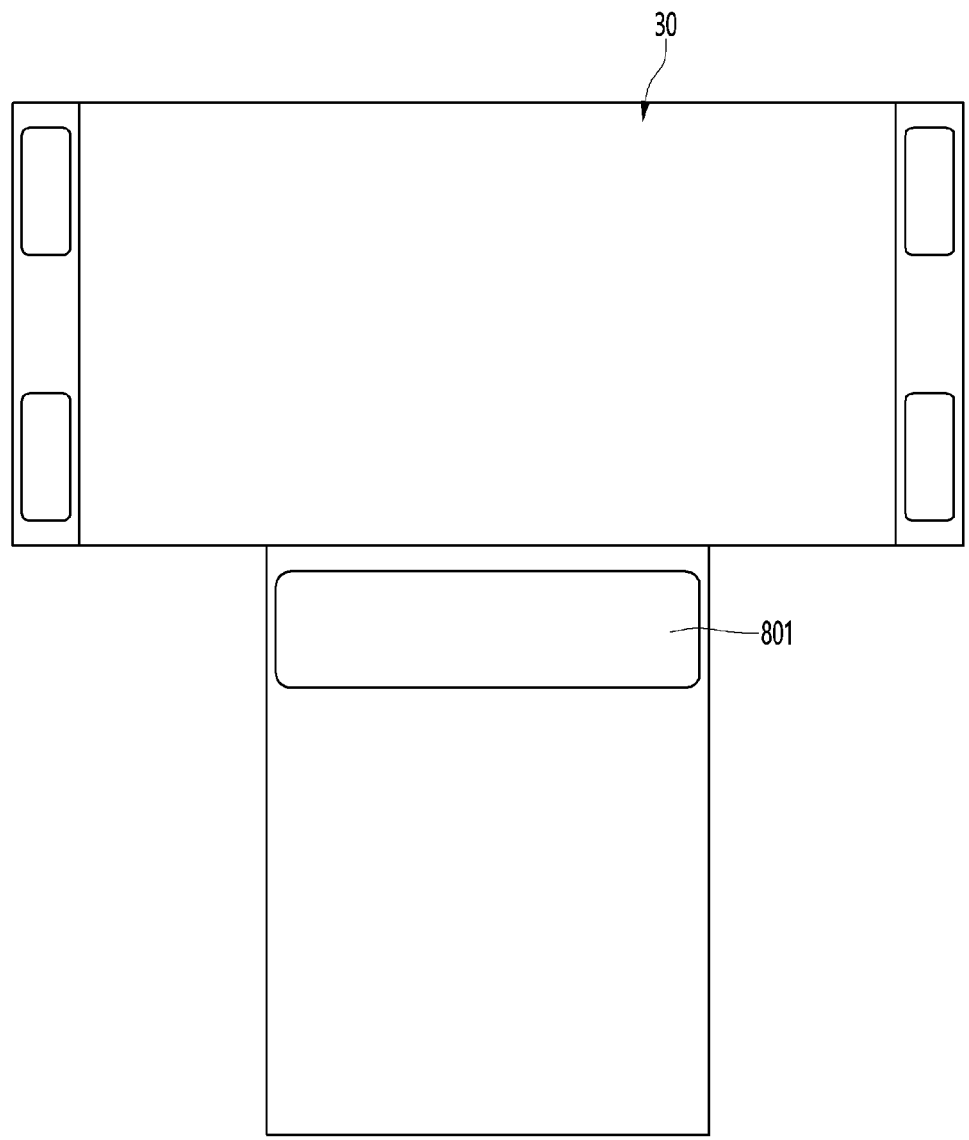
FIG. 32 is a view showing a woofer speaker exposed in a landscape mode state of a head according to an embodiment of the present disclosure.
Figure 33:
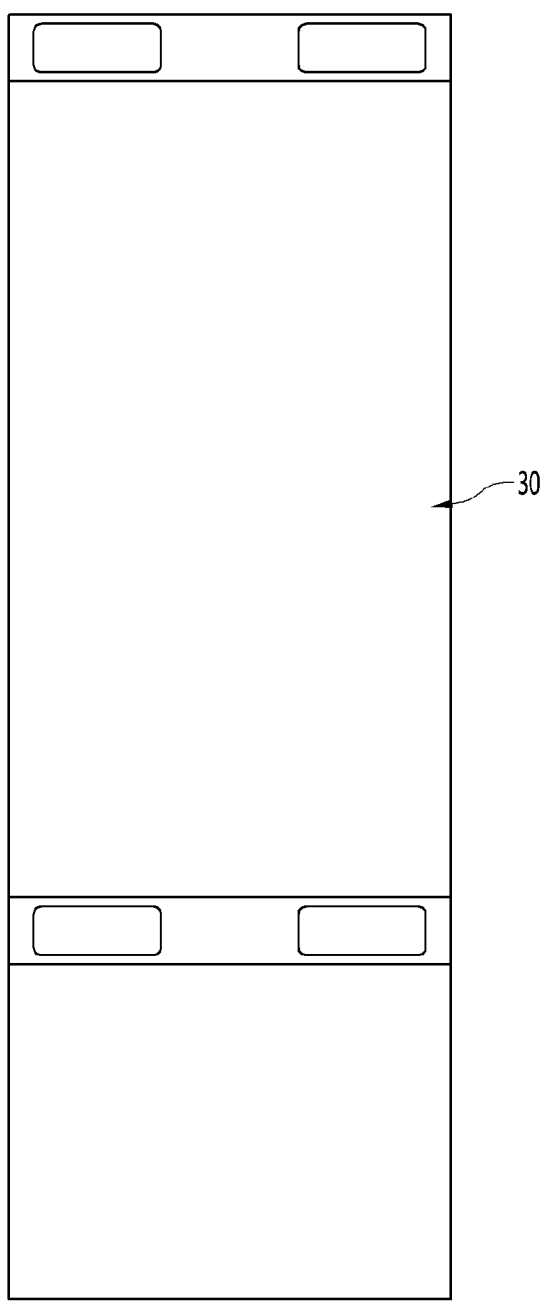
FIG. 33 is a view showing a woofer speaker hidden in a portrait mode state of a head according to an embodiment of the present disclosure.

FIG. 32 is a view showing a woofer speaker exposed in a landscape mode state of a head according to an embodiment of the present disclosure. FIG. 33 is a view showing a woofer speaker hidden in a portrait mode state of a head according to an embodiment of the present disclosure.

Referring to FIGS. 32 and 33, the display device 10 may further include a woofer speaker 801 disposed at a position hidden by the head 30 when the head 30 pivots to the portrait mode.

When the pivot state of the head 30 is switched to the portrait mode, the processor 180 may block the sound signal output of the woofer speaker 801. Accordingly, the processor 180 may block a woofer sound signal distorted by being hidden by the head 30.

Meanwhile, the display device 1 may further include the communication interface 110 for performing communication with one or more wireless speakers.

In addition, the processor 180 may pair with the display device 1 through the communication unit 110, display identification information of the paired wireless speakers on the display 31, receive the location of the paired wireless speakers from the user from the viewpoint of the user, and control the sound signals output from the paired wireless speakers based on the number and locations of the paired wireless speakers.

In addition, when the number and locations of the paired wireless speakers are changed, the processor 180 may switch the sound signals output from the paired wireless speakers based on the changed number and locations.

Figure 34:
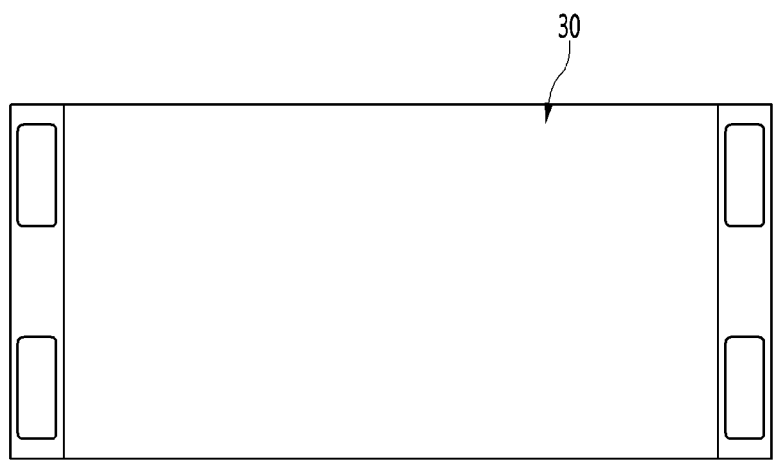
FIG. 34 is a view showing a state in which one wireless speaker is paired according to an embodiment of the present disclosure.
Figure 34:
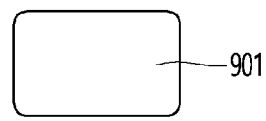

FIG. 34 is a view showing a state in which one wireless speaker is paired according to an embodiment of the present disclosure.

The processor 180 may output the sound output signal of the wireless speaker 901 as a woofer sound signal or a mono sound signal, when the paired first wireless speaker 901 is recognized and the first wireless speaker is located in front of the display device 1.

Figure 35:
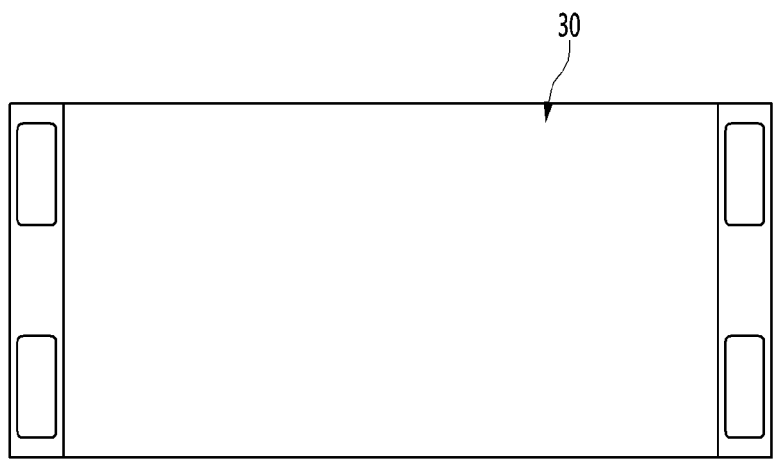
FIG. 35 is a view showing a state in which two wireless speakers are paired according to an embodiment of the present disclosure.
Figure 35:
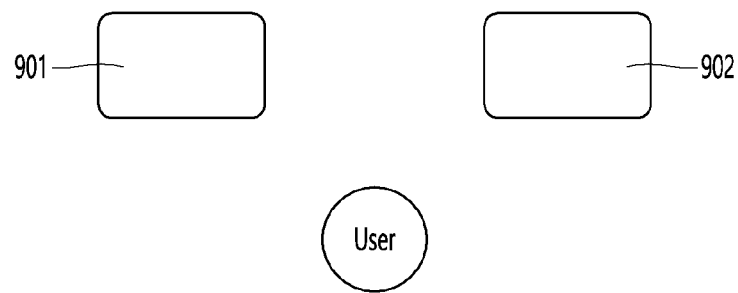

FIG. 35 is a view showing a state in which two wireless speakers are paired according to an embodiment of the present disclosure.

When a first wireless speaker 901 and a second wireless speaker 902 are paired and the first wireless speaker 901 and the second wireless speaker 902 are located between the display device 1 and a user, the processor 180 may perform control such that the first wireless speaker 901 outputs a left woofer sound signal, a left stereo sound signal or a mono sound signal and the second wireless speaker 902 outputs a right woofer sound signal, a right stereo sound signal or a mono sound signal.

Figure 36:
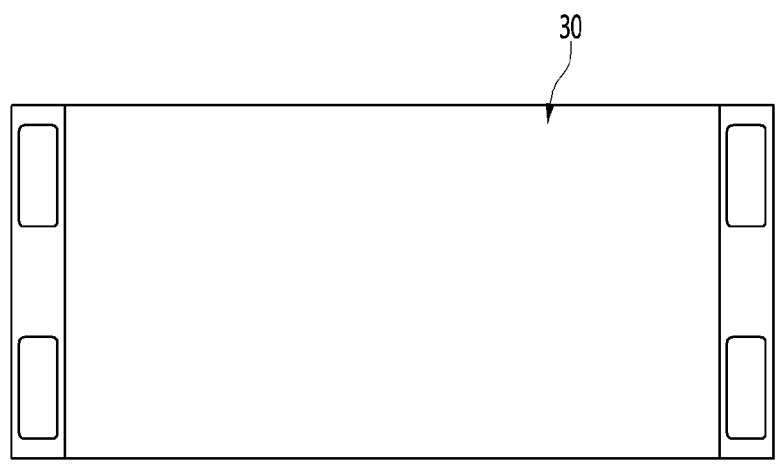
FIG. 36 is a view showing a state in which two wireless speakers are paired according to an embodiment of the present disclosure.
Figure 36:
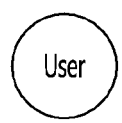
Figure 36:
Figure 36:
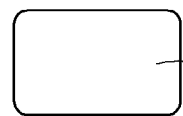

FIG. 36 is a view showing a state in which two wireless speakers are paired according to an embodiment of the present disclosure.

When a first wireless speaker 901 and a second wireless speaker 902 are paired and the first wireless speaker 901 and the second wireless speaker 902 are located behind the display device 1, the processor 180 may perform control such that the first wireless speaker 901 outputs a rear left surround sound and the second wireless speaker 902 outputs a rear right surround sound.

Figure 37:
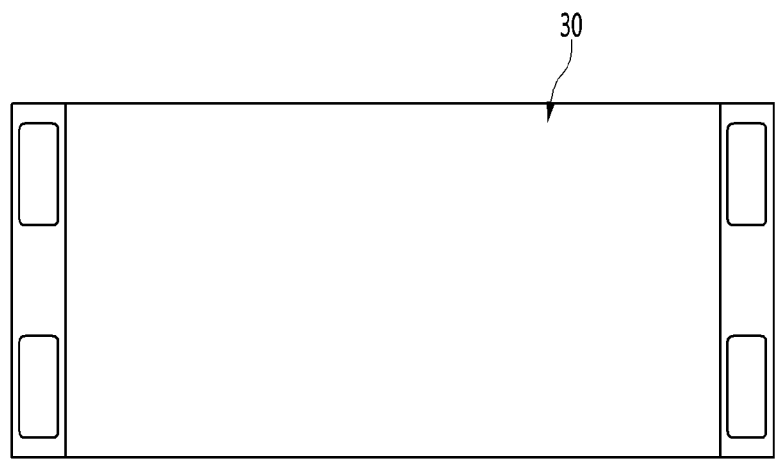
FIG. 37 is a view showing a state in which four wireless speakers are paired according to an embodiment of the present disclosure.
Figure 37:
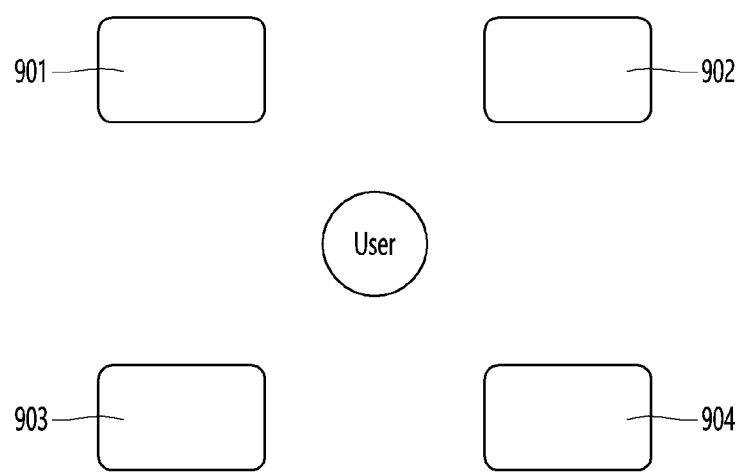

FIG. 37 is a view showing a state in which four wireless speakers are paired according to an embodiment of the present disclosure.

When a first wireless speaker 901 and a second wireless speaker 902 are paired and the first wireless speaker 901 and the second wireless speaker 902 are located between the display device 1 and a user, the processor 180 may perform control such that the first wireless speaker 901 outputs a left woofer sound signal, a left stereo sound signal or a mono sound signal and the second wireless speaker 902 outputs a right woofer sound signal, a right stereo sound signal or a mono sound signal.

When the third wireless speaker 903 and the fourth wireless speaker 904 are paired and the third wireless speaker 903 and the fourth wireless speaker 904 are located behind the user, the processor 180 may perform control such that the third wireless speaker 903 outputs the rear left surround sound and the fourth wireless speaker 904 outputs the rear right surround sound.

Figure 38:
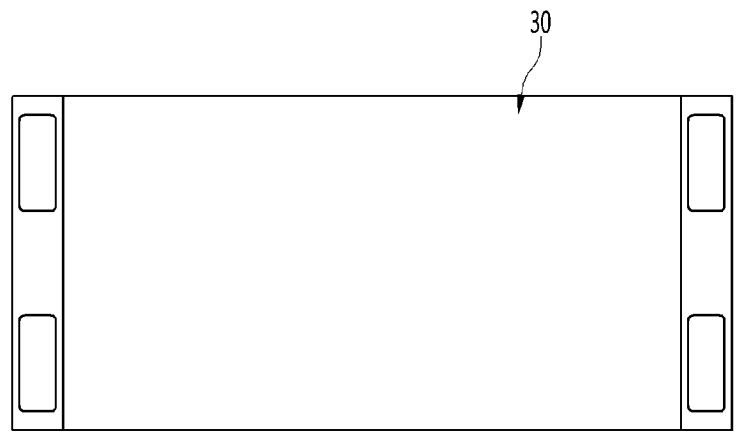
FIG. 38 is a view showing a state in which six wireless speakers are paired according to an embodiment of the present disclosure.
Figure 38:
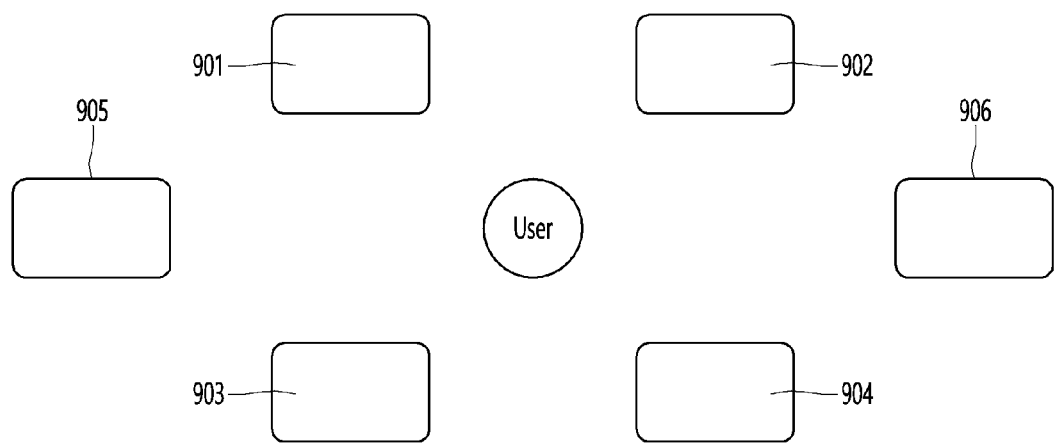

FIG. 38 is a view showing a state in which six wireless speakers are paired according to an embodiment of the present disclosure.

In the display device 1, a first wireless speaker 901 and a second wireless speaker 902 between the front side of the user and the display device 1 may be paired, a third wireless speaker 903 and a fourth wireless speaker 904 located behind the user may be paired, and a fifth wireless speaker 905 located on the left side of the user and a sixth wireless speaker 906 located on the right side of the user may be paired.

The processor 180 may perform control such that the fifth wireless speaker 905 outputs a side-rear left surround sound signal and the sixth wireless speaker 906 outputs a side-rear right surround sound signal.

According to the embodiment of the present disclosure, it is possible to provide a display device capable of controlling the type of sound output from speakers which rotate as a head rotates.

According to the embodiment of the present disclosure, it is possible to provide optimal sound by controlling the type of sound output from speakers according to the locations of the speakers rotating along with a head.

According to the embodiment of the present disclosure, it is possible to provide a natural sound effect during rotation in a landscape mode or a portrait mode by controlling the type of sound output from speakers when a head rotates in the landscape mode or the portrait mode.

According to the embodiment of the present disclosure, it is possible to provide a display device having a pair of long sides and a pair of short sides and having a natural sound effect satisfied by a user, by controlling the type of sound output from speakers even if arrangement of speakers in a landscape mode in which the long sides are in a horizontal state and arrangement of speakers in a portrait mode in which the long sides are in a vertical state are different.

What is claimed is:

1. A display device comprising:
a head including a display formed on a front surface of the head, the display having a circumference having a first long side, a second long side opposite the first long side, a first short side and a second short side opposite the first short side, and the head further including one or more first speakers provided on the first short side and one or more second speakers provided on the second short side of the display, wherein the head is configured to be pivotable between a landscape mode in which the first long side and the second long side are in a horizontal state and a portrait mode in which the first long side and the second long side are in a vertical state;
a sensor configured to detect a pivot of the head; and
a processor configured to determine a pivot state indicating whether the head is in the landscape mode or the portrait mode based on a result of detection by the sensor, and switch sound signals output by the one or more first speakers and the one or more second speakers when the pivot state is switched,
wherein the processor is further configured to switch the sound signals, such that the sound signals output when the head is in the landscape mode and the sound signals output when the head is in the portrait mode are different, and
wherein the processor is further configured to control the one or more first speakers to output an upper sound signal when the head is rotated by 90 degrees clockwise to switch the pivot state from indicating that the head is in the landscape mode to indicating that the head is in the portrait mode, and control the one or more second speakers to output an upper sound signal when the head is rotated by 90 degrees counterclockwise to switch the pivot state from indicating that the head is in the landscape mode to indicating that the head is in the portrait mode.

2. The display device of claim 1, wherein the sound signals include at least one of a left sound signal, a right sound signal, an upper left sound signal, an upper right sound signal, a mono sound signal or a woofer sound signal.

3. The display device of claim 1,
wherein the head further includes one or more third speakers provided on the first long side and one or more fourth speakers provided on the second long side, and wherein the processor is further configured to switch second sound signals output from the one or more third speakers and the one or more fourth speakers, such that the second sound signals output when the head is in the landscape mode and the second sound signals output when the head is in the portrait mode are different.

4. The display device of claim 3,
wherein the sensor is further configured to detect a pivot direction and a pivot angle of the head, and
wherein the processor is further configured to control sound signals output from the speakers based on the pivot direction and the pivot angle, such that spatial locations of the sound signals output from the speakers before the pivot and spatial locations of the sound signals output from the speakers after the pivot match each other.

5. The display device of claim 3, wherein, when the head is rotated by 90 degrees clockwise to switch the pivot state from indicating that the head is in the landscape mode to indicating that the head is the portrait mode, the processor is further configured to switch the sound signals and the second sound signals, such that the sound signals output by the one or more first speakers are to be output by the one or more fourth speakers, the sound signals output by the one or more second speakers are to be output by the one or more third speakers, the second sound signals output by the one or more third speakers are to be output by the one or more first speakers, and the second sound signals output by the one or more fourth speakers are to be output by the one or more second speakers.

6. The display device of claim 3, wherein, when the head is rotated by 90 degrees counterclockwise to switch the pivot state from indicating that the head is the landscape mode to indicating that the head is in the portrait mode, the processor is further configured to switch the sound signals and the second sound signals, such that the sound signals output by the one or more first speakers are to be output by the one or more third speakers, the sound signals output by the one or more second speakers are to be output by the one or more fourth speakers, the second sound signals output by the one or more third speakers are to be output by the one or more second speakers, and the second sound signals output by the one or more fourth speakers are to be output by the one or more first speakers.

7. The display device of claim 1, wherein, when the head is rotated by 180 degrees, the processor is further configured to switch the sound signals, such that the sound signals output by the one or more first speakers are to be output by the one or more second speakers, and the sound signals output by the one or more second speakers are to be output by the one or more first speakers.

8. The display device of claim 1,
wherein the one or more first speakers include a first upper speaker disposed on an upper portion of the first short side and a first lower speaker disposed on a lower portion of the first short side, and
wherein the one or more second speakers include a second upper speaker disposed on an upper portion of the second short side and a second lower speaker disposed on a lower portion of the second short side.

9. The display device of claim 8, wherein, when the head is rotated by 90 degrees clockwise to switch the pivot state from indicating the head is in the landscape mode to indicating that the head is in the portrait mode, the processor is further configured to control the sound signals, such that the first upper speaker outputs a right sound signal or an upper right sound signal, the first lower speaker outputs a left sound signal or an upper left sound signal, the second upper speaker outputs the right sound signal or a mono sound signal, and the second lower speaker outputs the left sound signal or the mono sound signal.

10. The display device of claim 8, wherein, when the head is rotated by 90 degrees counterclockwise to switch the pivot state from indicating the head is in the landscape mode to indicating the head is in the portrait mode, the processor is further configured to control the sound signals, such that the first upper speaker outputs a left sound signal or a mono sound signal, the first lower speaker outputs a right sound signal or a mono sound signal, the second upper speaker outputs the left sound signal or an upper left sound signal, and the second lower speaker outputs the right sound signal or an upper right sound signal.

11. The display device of claim 8,
wherein the head further includes a third left speaker disposed on a left portion of the first long side, a third right speaker located on a right portion of the first long side, a fourth left speaker disposed on a left portion of the second long side and a fourth right speaker disposed on a right portion of the second long side, and
wherein the processor is further configured to control sound signals output from the speakers, such that spatial locations of the sound signals output from the speakers before the pivot and spatial locations of the sound signals output from the speakers after the pivot match each other.

12. The display device of claim 11, wherein, when the head is rotated by 90 degrees clockwise to switch the pivot state from indicating the head is in the landscape mode to indicating the head is in the portrait mode, the processor is further configured to control the sound signals output from the speakers, such that the third left speaker and the third right speaker output a right sound signal, and the fourth left speaker and the fourth right speaker output a left sound signal, and
wherein, when the head is rotated by 90 degrees counterclockwise to switch the pivot state from indicating the head is in the landscape mode to indicating the head is in the portrait mode, the processor is further configured to control the sound signals output from the speakers, such that the third left speaker and the third right speaker output the left sound signal, and the fourth left speaker and the fourth right speaker output the right sound signal.

13. A display device comprising:
a head including a display formed on a front surface of the head, the display having a circumference having a first long side, a second long side opposite the first long side, a first short side and a second short side opposite the first short side, and the head further including a plurality of panel speakers attached to a panel of the display, wherein the head is configured to be pivotable between a landscape mode in which the first long side and the second long side are in a horizontal state and a portrait mode in which the first long side and the second long side are in a vertical state;
a sensor configured to detect a pivot of the head; and
a processor configured to determine a pivot state indicating whether the head is in the landscape mode or the portrait mode based on a result of detection by the sensor, and switch sound signals output by the plurality of panel speakers when the pivot state is switched,
wherein the sensor is further configured to detect a pivot direction and a pivot angle of the head, and wherein the processor is further configured to determine spatial locations of the plurality of panel speakers based on the pivot direction and the pivot angle and control the plurality of panel speakers such that the panel speakers output sound signals set according to spatial arrangement of the panel speakers.

14. The display device of claim 13,
wherein the processor is further configured to switch the sound signals output from the plurality of panel speakers based on the pivot direction and the pivot angle, such that spatial locations of the sound signals output before the pivot and spatial locations of the sound signals output after the pivot match each other.

15. The display device of claim 13, further comprising a woofer speaker disposed to be hidden by the head when the head is pivoted to be in the portrait mode,
wherein the processor is further configured to block sound signal output from the woofer speaker when the pivot state of the head is switched to indicate that the head is in the portrait mode.

16. The display device of claim 13, further comprising a communication interface configured to perform communication with one or more wireless speakers,
wherein the processor is further configured to perform pairing with the one or more wireless speakers through the communication interface, to display identification information of the paired one or more wireless speakers on the display, to receive locations of the paired one or more wireless speakers from a user with respect to a viewpoint of the user, and to control sound signals output by the paired one or more wireless speakers based on a number and the locations of the paired one or more wireless speakers.

17. The display device of claim 16, wherein, when the number and the locations of the paired one or more wireless speakers are changed, the processor is further configured to switch the sound signals output by the paired one or more wireless speakers based on the changed number and the changed locations.

* * * * *